(12) United States Patent
Mima

(10) Patent No.: US 6,879,357 B2
(45) Date of Patent: Apr. 12, 2005

(54) LIQUID CRYSTAL DISPLAY DEVICE

(75) Inventor: Toshiyuki Mima, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/207,952

(22) Filed: Jul. 31, 2002

(65) Prior Publication Data

US 2003/0043319 A1 Mar. 6, 2003

(30) Foreign Application Priority Data

Aug. 28, 2001 (JP) ........................................ 2001-257333

(51) Int. Cl.[7] ............................................ G02F 1/1333
(52) U.S. Cl. ....................... 349/110; 349/126; 349/128; 349/130
(58) Field of Search ................. 349/110, 111, 349/123, 126, 128–130

(56) References Cited

U.S. PATENT DOCUMENTS

| | | | | |
|---|---|---|---|---|
| 6,011,604 A | * | 1/2000 | Miyazawa | 349/110 |
| 6,452,656 B2 | * | 9/2002 | Niwano et al. | 349/141 |
| 6,583,836 B2 | * | 6/2003 | Kim et al. | 349/129 |
| 6,583,846 B1 | | 6/2003 | Yanagawa et al. | |
| 2002/0044239 A1 | * | 4/2002 | Koyama | 349/110 |
| 2003/0112393 A1 | * | 6/2003 | Watanabe et al. | 349/123 |

FOREIGN PATENT DOCUMENTS

| | | | | |
|---|---|---|---|---|
| JP | 2000-298282 | | 4/1999 | |
| JP | 2000298282 A | * | 10/2000 | G02F/1/1339 |

* cited by examiner

Primary Examiner—Tarifur R. Chowdhury
Assistant Examiner—Michael H. Caley
(74) Attorney, Agent, or Firm—Reed Smith LLP; Stanley P. Fisher, Esq.; Juan Carlos A. Marquez, Esq.

(57) ABSTRACT

For suppressing the disclination caused due to misalignment between a pair of substrates of the TFT-type Liquid Crystal Display Device, the present invention makes light shielding widths of the pixel electrode formed on one of the substrates having a plurality of image signal lines together with the pixel electrodes asymmetry in accordance with an angle formed by an extension direction of the image signal line and a rubbing direction of the one of the substrates. Namely, the light shielding width of the pixel electrode at the image signal line side supplying an image signal to the pixel electrode should be broader if the angle is acute, and the light shielding width of the pixel electrode at the image signal line side supplying an image signal to the pixel electrode should be broader if the angle is obtuse, respectively.

8 Claims, 17 Drawing Sheets

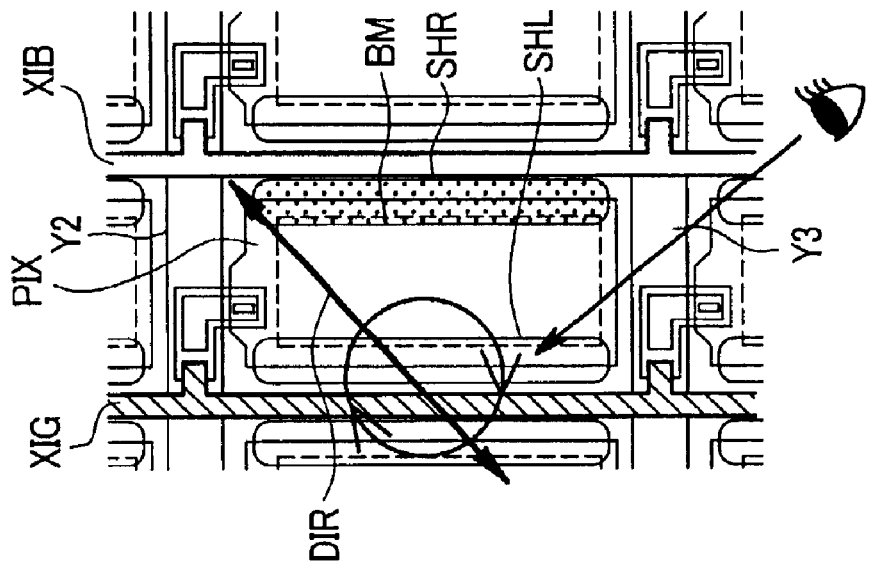
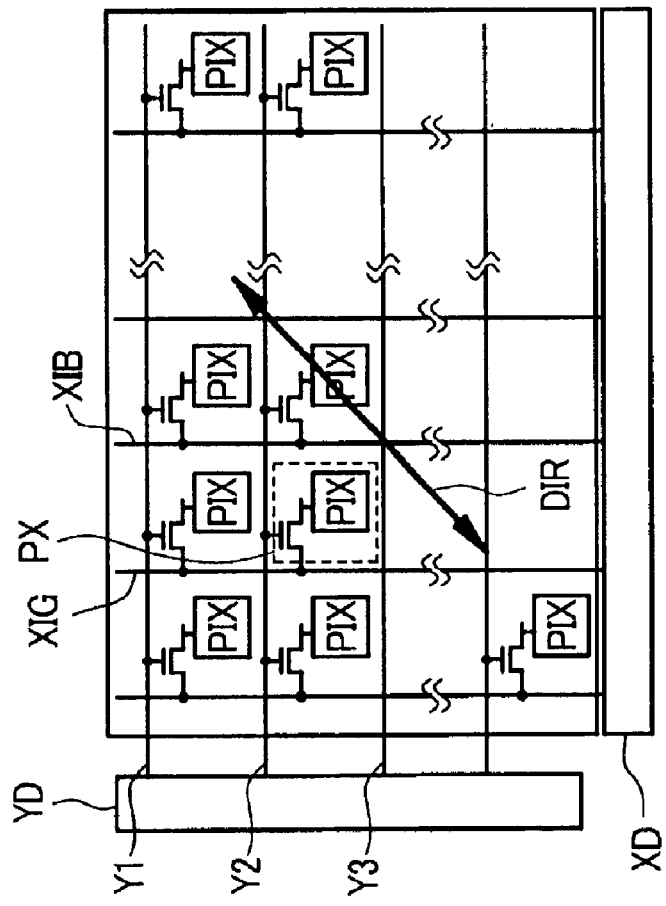
FIG. 6A
FIG. 6B

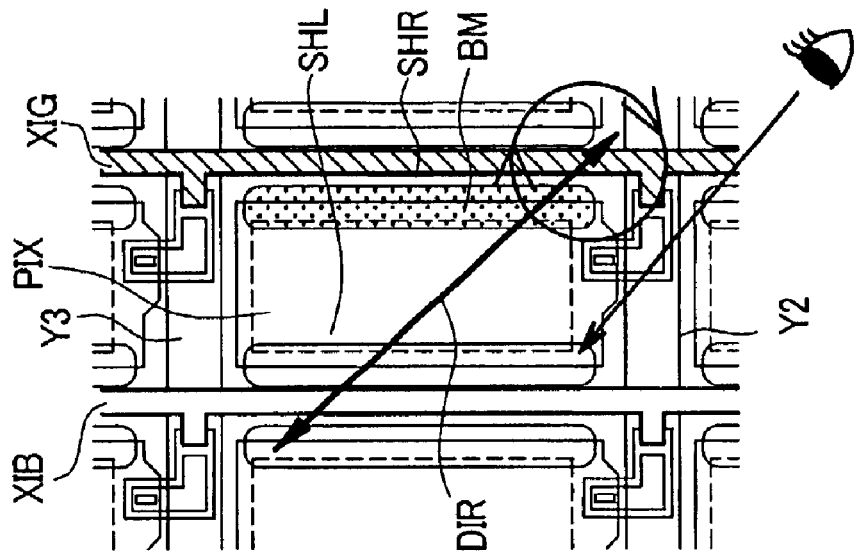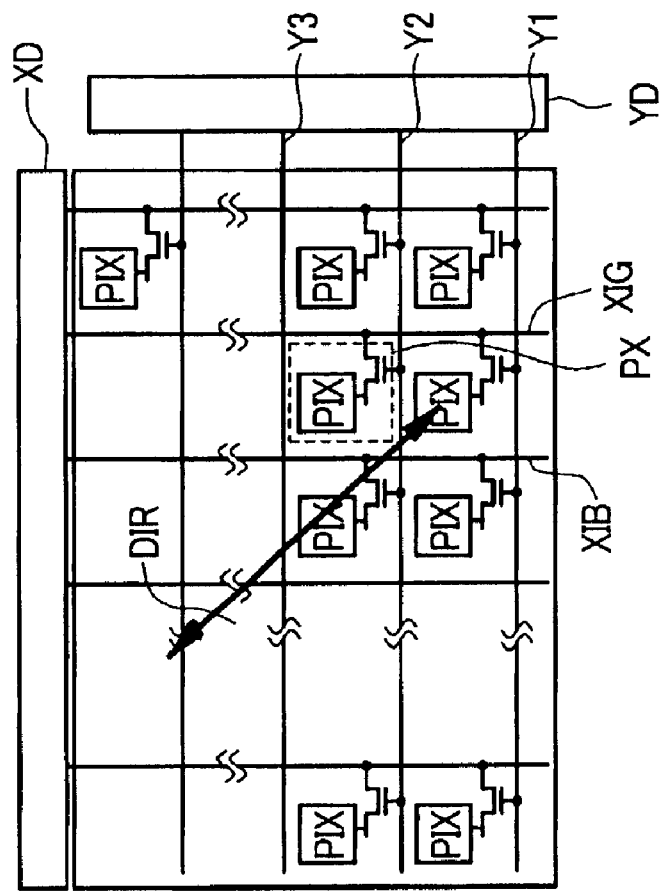

$90° > \theta 2 > 0°$ $180° > \theta 1, \theta 3 > 90°$

LIQUID CRYSTAL DISPLAY DEVICE

BACKGROUND OF THE INVENTION

1. Field of the Invention

The present invention relates to a liquid crystal display device, and more particularly to a liquid crystal display device which can realize an image display of high quality by suppressing a defective display derived from the misalignment of a pair of substrates.

2. Description of the Related Art

A liquid crystal display device has been popularly used as a thin and light-weighted display device having high definition and capable of performing a color display for a note-book type computer, a display monitor of a television receiver set. Liquid crystal display panels constituting the liquid crystal display devices of this type are roughly classified into those of a single matrix type interposing a liquid crystal layer between a pair of substrates both of which form parallel electrodes arranged to intersect each other on respective inner surfaces thereof and those of an active matrix type having switching elements for selecting respective pixel units formed on one of a pair of substrates.

As the active matrix type liquid crystal display panel, a so-called vertical electric field type (generally referred to as "TN method") which forms groups of electrodes for pixel selection on a pair of upper and lower substrates respectively as represented by a twisted nematic (TN type) and a so-called a lateral electric field type (generally referred to as "IPS type") which forms a group of electrodes for pixel selection on only one of a pair of upper and lower substrates are known.

In the former TN type liquid crystal display panel, liquid crystal is oriented with a twisting of 90°, for example, within a pair of substrates (first substrate (lower substrate) and second substrate (upper substrate)), and two polarizing plates are laminated to outer surfaces of the upper and lower substrates of the liquid crystal display panel such that their absorption axis directions are arranged in a cross Nicol, and the incident-side absorption axis is arranged parallel to or perpendicular to the rubbing direction.

In such a TN type active matrix liquid crystal display panel, an incident light assumes a linear polarized light at the incident-side polarizing plate when a voltage is not applied, and the linear polarized light is propagated along the twisting of the liquid crystal layer. When a transmission axis of the irradiation-side polarizing plate is aligned with an azimuth angle of the whole linear polarized light, the linear polarized light is wholly irradiated thus providing a white display (so-called normally open mode). On the other hand, when the voltage is applied, the direction of a unit vector (director) which indicates the average orientation direction of axes of liquid crystal molecules which constitute the liquid crystal layer is directed in the direction perpendicular to a surface of the substrate and is aligned with an absorption axis of the irradiation-side polarizing plate since the azimuth angle of the incident-side linear polarized light is not changed thus providing a black display (see "Ekisho no Kiso to Oyo (Basic and Application of Liquid Crystal)" published by Kogyo Chosa Kai in 1991).

On the other hand, in the IPS type liquid crystal display panel in which a group of electrodes and a group of electric wiring for selecting pixels are formed on only one of a pair of substrates and the switching of the liquid crystal layer is performed in the direction parallel to the surface of the substrate by applying a voltage between neighboring electrodes (between the pixel electrode and the counter electrode) on the substrate, polarizing plates are arranged such that a black display is provided when the voltage is not applied (so-called normally closed mode).

In the liquid crystal layer of the IPS type liquid crystal display panel, the director of the liquid crystal layer which is arranged in a homogeneous orientation parallel to the surface of the substrate in the initial state and is arranged on a plane parallel to the substrate is arranged parallel to the direction of electrode wiring or makes a certain angle with respect to the direction of electrode wiring when the voltage is not applied, the direction of the director of the liquid crystal layer is shifted in the direction perpendicular to the electrode wiring direction along with the applying of the voltage when the voltage is applied. When the direction of the director of the liquid crystal layer is inclined in the electrode wiring direction by 45° with respect to the direction of the director when the voltage is not applied, the liquid crystal layer at the time of applying the voltage has an azimuth angle of the polarized light rotated by 90° as if a ½ wavelength plate so that a transmission axis of the irradiation-side polarizing plate and the azimuth angle of polarization are aligned thus providing the white display. This IPS type liquid crystal display panel is characterized in that the change of hue and contrast is small also in a viewing angle so that it is possible to obtain a wide viewing angle (see Japanese Laid-open Patent Publication 505247/1993).

With respect to the active matrix type liquid crystal display device among the above-mentioned liquid crystal display devices using various types of liquid crystal display panels, a black matrix (BM) which partitions respective pixels is formed on one of a pair of substrates so as to enhance the contrast. Particularly with respect to the TN type liquid crystal display device, switching elements such as thin film transistors (TFT) or the like are formed on a lower substrate side which constitutes the first substrate, color filters are formed on an upper substrate side which constitutes the second substrate, and the black matrix BM is provided around respective color filters formed on the second substrate. Further, a light shielding film is formed such that the light shielding film covers signal lines which supply driving signals to the switching elements formed on the first substrate so as to enhance the contrast of display images.

FIG. 19A, and FIG. 19B are schematic views showing a pixel portion of the TN type liquid crystal display device in an enlarged form, wherein FIG. 19A is a plan view and FIG. 19B is a cross-sectional view taken along a line A—A of FIG. 19A. With respect to this liquid crystal display device, on a main surface of a first substrate (lower substrate) SUB1, thin film transistors, pixel electrodes, video signal lines and scanning signal lines are formed, while on a main surface of a second substrate (upper substrate) SUB2, a black matrix, color filters disposed in regions surrounded by the black matrix and common electrodes (none of them shown in FIG. 19A and FIG. 19B) are arranged. In FIG. 19A and FIG. 19B, Xn, Xn+1 indicate video signal lines, Yn, Yn+1 indicate scanning signal lines, PIX indicates pixel electrodes, TFT indicates thin film transistors which constitute switching elements, and DCN indicates disclination areas (contrast reduced areas due to leaking of light) which are generated around the pixels. Orientation films which are brought into contact with a liquid crystal layer LC are respectively formed on uppermost layers of respective main surfaces of a pair of substrates. However, these orientation films are omitted in FIG. 19A and FIG. 19B.

SUMMARY OF THE INVENTION

In such a liquid crystal display device, along with the increase of demand for high definition and narrowing of the pixel pitch, the high accuracy is demanded with respect to the alignment of the first substrate SUB1 and the second substrate SUB2. When these substrates SUB1, SUB2 are misaligned, it gives rise to leaking of light between the black matrix or the light shielding film and the pixel electrodes so that the above-mentioned disclination is generated. As a result, the contrast is reduced thus bringing about a defective image quality.

FIG. 20A and FIG. 20B are schematic views for explaining the leaking of light which is generated asymmetrically in the periphery of the pixel electrode and is found by inventors of the present inventions. These drawings correspond to cross-sectional views taken along a line A—A in FIG. 19A. FIG. 20A shows a state in which the disclination is generated when the second substrate SUB2 is misaligned in the right side in the drawing with respect to the first substrate SUB1 and FIG. 20B shows a state in which the disclination is generated when the second substrate SUB2 is misaligned in the left side in the drawing with respect to the first substrate SUB1. In FIG. 20A and FIG. 20B, Xn indicates a video signal line which drives the pixel electrode PIX and Xn+1 indicates a video signal line which drives a pixel electrode PIX' which is disposed close to and at the right side of the pixel electrode PIX shown in FIG. 20A and FIG. 20B respectively.

When the second substrate SUB2 is shifted in the left or right direction in FIG. 20A or FIG. 20B with respect to the first substrate SUB1, the twisting of the liquid crystal layer LC is disturbed by an electric field in the lateral direction generated between the pixel electrode and the video signal line and this causes the leaking of light. In FIG. 20A, the disclination is generated in a boundary area between the pixel electrode PIX and the video signal line Xn+1 adjacent to the pixel electrode PIX. In the same manner, in FIG. 20B, the disclination is generated in a boundary area between the pixel electrode PIX and the video signal line Xn. Although these disclinations may not be observed when the display surface of the liquid crystal display device is observed from a front side, these disclinations become apparent when the screen is observed from the left side or the right side as shown in FIG. 20A and FIG. 20B respectively.

Further, it is observed that the way the above-mentioned disclination appear differs between the left direction and the right direction. According to a result of a study carried out by the inventors of the present invention, it is found that the way the disclination appears is relevant to the direction of the rubbing formed on the orientation film of the first substrate SUB1. In view of this fact, it is an object of the present invention to provide a liquid crystal display device which can realize an image display of high quality by suppressing the generation of disclination derived from the misalignment of the first substrate and the second substrate by determining the relationship between the rubbing direction of the orientation film and the black matrix or the light shielding film.

To achieve the above-mentioned object, according to the present invention, the width of the black matrix or the light shielding film at the misalignment direction side and the width of the black matrix or the light shielding film at a side opposite to the misalignment direction side are made asymmetrical from each other corresponding to the video signal lines provided to the first substrate and the rubbing direction of the orientation film. To describe typical constitutions of the present invention, they are as follows.

(1) In a liquid crystal display device comprising;
a first substrate having a plurality of pixel electrodes arranged along a first direction and a second direction intersecting the first direction and a plurality of signal lines extended along the first direction and arranged in parallel along the second direction,
a second substrate connected to the first substrate such that the second substrate is spaced from a main surface of the first substrate and faces the main surface of the first substrate in an opposed manner, and a liquid crystal layer sealed between the first substrate and the second substrate,
wherein an orientation film (an alignment film) which is brought into contact with the liquid crystal layer is formed on the main surface of the first substrate,
the plurality of pixel electrodes are arranged in a row along the first direction in each area sandwiched between the pair of neighboring signal lines of the plurality of signal lines, and respective pixel electrodes arranged in the row are connected to one of the pair of the signal lines through switching elements,
a light shielding portion extending along the first direction and having a first width along the second direction is formed on end portions of the pixel electrodes arranged in the row along one of the pair of the signal lines and a light shielding portion extending along the first direction and having a second width along the second direction is formed on end portions of the pixel electrodes arranged in the row along the other of the pair of the signal lines, and
on the main surface of the first substrate, rubbing treatment is applied to the orientation film in a direction which makes an obtuse angle in the clockwise direction with respect to an extension direction of at least one of the signal lines, and the second width of the light shielding portion which is formed with respect to the pixel electrode is set broader than the first width of the light shielding portion which is formed with respect to the pixel electrode.

(2) In the constitution (1), an overlapping width of the pixel electrode and the light shielding portion along the other of the pair of the signal lines is broader than an overlapping width of the pixel electrode and the light shielding portion along one of the pair of the signal lines.

(3) In the constitution (1) or (2), the first and second light shielding portions are formed of a black matrix formed on the second substrate.

(4) In the constitution (1) or (2), the light shielding portions are light shielding films which are formed so as to cover the vicinity of a video signal line formed on the first substrate.

(5) In a liquid crystal display device comprising;
a first substrate having a plurality of pixel electrodes arranged along a first direction and a second direction intersecting the first direction and a plurality of signal lines extended along the first direction and arranged in parallel along the second direction,
a second substrate connected to the first substrate such that the second substrate is spaced from a main surface of the first substrate and faces the main surface of the first substrate in an opposed manner, and a liquid crystal layer sealed between the first substrate and the second substrate,
wherein an orientation film which is brought into contact with the liquid crystal layer is formed on the main surface of the first substrate,
the plurality of pixel electrodes are arranged in a row along the first direction in each area sandwiched between the pair of neighboring signal lines of the plurality of signal lines, and respective pixel electrodes arranged in the row are connected to one of the pair of the signal lines through switching elements, a light shielding portion extending along the first direction and having a first width along the second direction is formed on end portions of the pixel electrodes arranged in the row along one of the pair of the signal lines and a light shielding portion extending along the first direction and having a second width along the second direction is formed on end portions of the pixel electrodes arranged in the row along the other of the pair of the signal lines, and on the main surface of the first substrate, rubbing treatment is applied to the orientation film in a direction which makes an acute angle in the clockwise direction with respect to an extension direction of at least one of the signal lines, and the first width of the light shielding portion which is formed with respect to the pixel electrode is set broader than the second width of the light shielding portion which is formed with respect to the pixel electrode.

(6) In the constitution (5), an overlapping width of the pixel electrode and the light shielding portion along one of the pair of the signal lines is broader than an overlapping width of the pixel electrode and the light shielding portion along the other of the pair of the signal lines.

(7) In the constitution (5) or (6), the light shielding portions are formed of a black matrix formed on the second substrate.

(8) In the constitution (5) or (6), wherein the light shielding portions are light shielding films formed so as to cover the vicinity of a video signal line formed on the first substrate.

By adopting above-mentioned respective constitutions, it is possible to obtain a liquid crystal display device of high quality which can enhance a contrast of a vision in the left and right direction on a screen by increasing the tolerance of overlapping between the first substrate and the second substrate while suppressing the reduction of a numerical aperture. It is needless to say that the present invention is not limited to the above-mentioned constitutions and constitutions of embodiments which will be explained hereinafter and various modifications of the present invention are conceivable without departing from the spirit of the present invention.

BRIEF DESCRIPTION OF THE DRAWINGS

FIG. 6A and FIG. 6B are explanatory views showing the rubbing direction of an orientation film of a first substrate and a second case in which leaking of light from the pixel is generated;

FIG. 7A and FIG. 7B are explanatory views showing the rubbing direction of an orientation film of a first substrate and a third case in which leaking of light from the pixel is generated;

DETAILED DESCRIPTION

Figure 1:
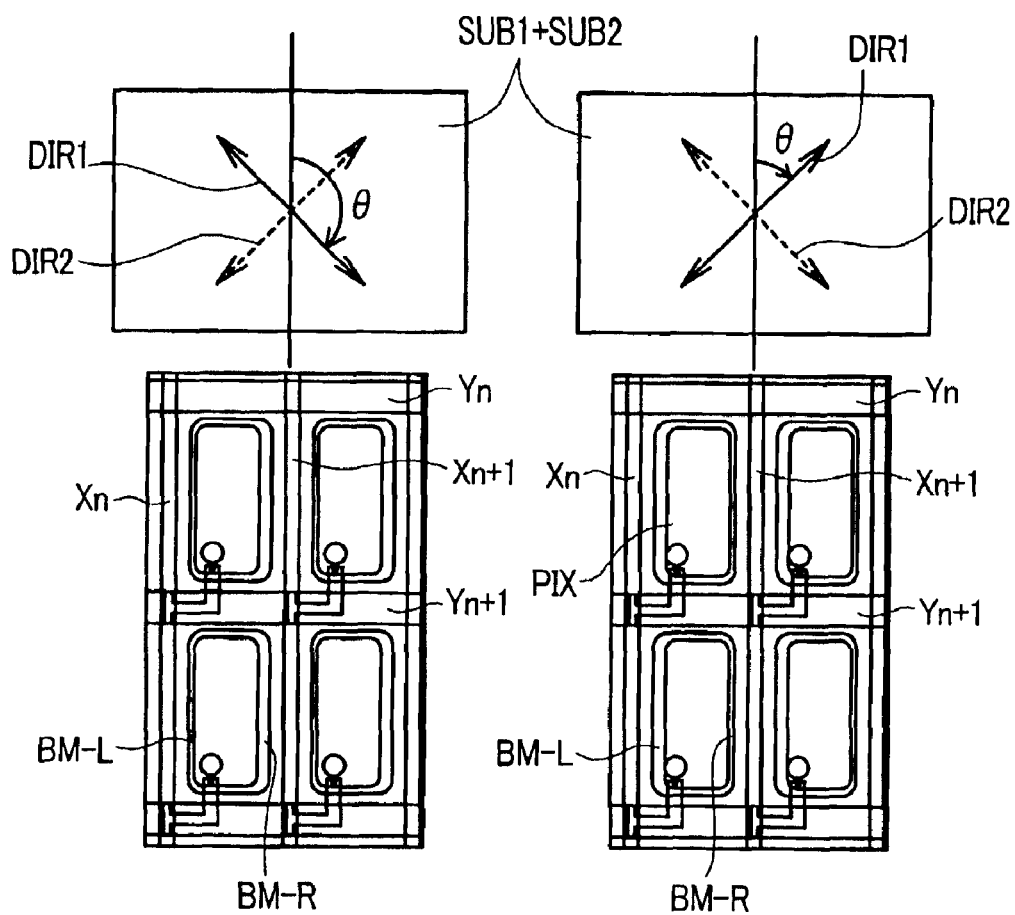
FIG. 1A and FIG. 1B are schematic views for explaining the constitution of the first embodiment of a liquid crystal display device of the present invention.

Preferred embodiments of a liquid crystal display device according to the present invention are explained hereinafter in conjunction with attached drawings.

FIG. 1A and FIG. 1B are schematic views for explaining the constitution of the first embodiment of a liquid crystal display device of the present invention. Each drawing is comprised of an enlarged view (lower side) showing a group of pixels (four pixels illustrated) constituted of a first substrate SUB1 and a second substrate SUB2 facing each other in an opposed manner while sandwiching a liquid crystal layer therebetween and an explanatory view (upper side) showing directions DIR1, DIR2 of rubbing applied to the respective substrates. Each pixel is constituted by limiting a surface of a pixel electrode PIX formed on a main surface of the first substrate SUB1 using an opening of a black matrix formed on a main surface of the second substrate SUB2. FIG. 1A shows a case in which an intersecting angle θ in a clockwise direction made by the rubbing direction DIR1 of an orientation film and a video signal line X on the first substrate is set to an obtuse angle (90°<θ<180°) and FIG. 1B shows a case in which an intersecting angle θ in a clockwise direction made by the rubbing direction DIR of an orientation film and a video signal line X on the first substrate is set to an acute angle (0°<θ<90°).

In FIG. 1A and FIG. 1B, SUB1+SUB2 indicates the first substrate SUB1 and the second substrate SUB2 being overlapped with one another, and the rubbing direction DIR1 of the orientation film on the first substrate SUB1 and the rubbing direction DIR2 of the orientation film on the second substrate SUB2 are shown in a plane thereof as viewed from the second substrate SUB2 side. Further, Xn, Xn+1 indicate video signal lines, wherein Xn indicates a video signal line which drives the target pixel electrode PIX and Xn+1 indicates another video signal line which is disposed adjacent to the pixel electrode PIX. Yn, Yn+1 indicate scanning signal lines.

The pixel electrode PIX is arranged in a region which is surrounded by a pair of video signal lines Xn and Xn+1 and a pair of scanning signal lines Yn and Yn+1. The pixel electrode PIX is exposed to an opening of the black matrix formed on the second substrate SUB2, wherein the pixel electrode PIX has a left side thereof in FIG. 1A and FIG. 1B respectively overlapped to the left-side area BM-L of the black matrix and has a right side thereof in FIG. 1A and FIG. 1B respectively overlapped to the right-side area BM-R of the black matrix.

When the rubbing direction DIR1 of the orientation film provided to the first substrate SUB1 shown in FIG. 1A makes the intersecting angle θ of an obtuse angle in the clockwise direction with respect to the video signal line, the width of the right-side area BM-R of the black matrix is set greater than the width of the left-side area BM-L of the black matrix. That is, here assumed is a state in which the opening of the black matrix is shifted to the left side in FIG. 1A with respect to the pixel electrode PIX. In this manner, the disclination derived from the arrangement that the rubbing direction DIR1 of the first orientation film makes an obtuse angle in the clockwise direction with respect to the video signal line can be suppressed.

When the rubbing direction DIR1 of the orientation film provided to the first substrate SUB1 shown in FIG. 1B makes an intersecting angle θ of an acute angle in the clockwise direction with respect to the video signal line, the width of the left-side area BM-L of the black matrix is set greater than the width of the right-side area BM-R of the black matrix. That is, here assumed is a state in which the opening of the black matrix is shifted to the right side in FIG. 1B with respect to the pixel electrode PIX. In this manner, the disclination derived from the arrangement that the rubbing direction DIR1 of the first orientation film makes an acute angle in the clockwise direction with respect to the video signal line can be suppressed. Accordingly, in the transmission type liquid crystal display device, by suppressing the brightness of a backlight, the power consumption can be reduced.

Figure 2:
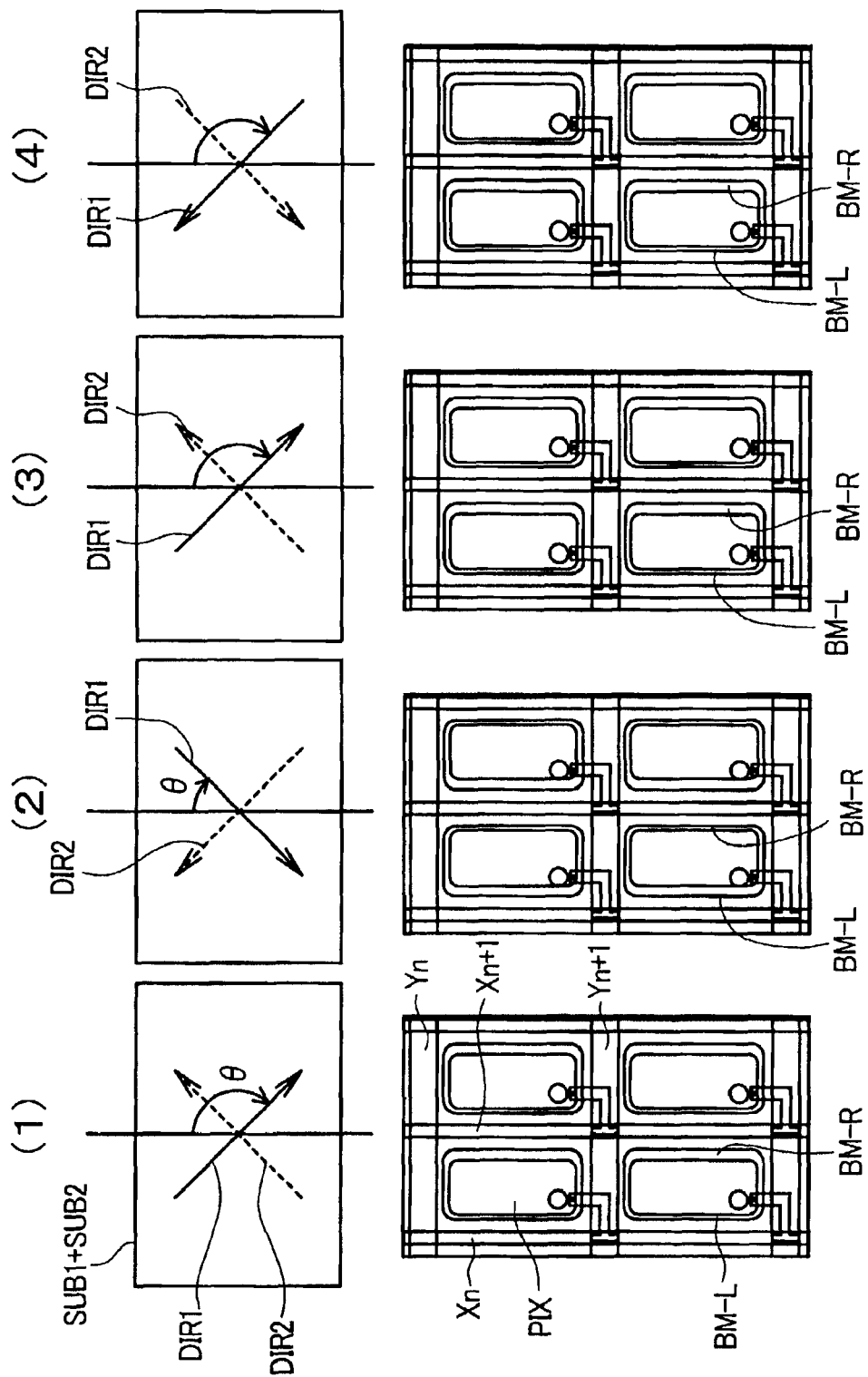
FIG. 2 is an explanatory view of a typical constitution which makes the widths of the left and right areas which form an opening of a black matrix for every rubbing direction of an orientation film in FIG. 1A and FIG. 1B asymmetrical.

FIG. 2 is an explanatory view of typical constitutions which make the widths of left and right areas constituting the opening of the black matrix for each rubbing direction of the orientation film in FIG. 1 asymmetrical. Reference numerals in the drawing are used in the same manner as those in FIG. 1. The case (1) shown in FIG. 2 is a case in which the rubbing direction DIR1 of the orientation film of the first substrate SUB1 makes a clockwise obtuse angle θ in the right downward direction with respect to the video signal line and the rubbing direction DIR2 of the orientation film of the second substrate SUB2 is set to the right upward direction. Here, with respect to the black matrix, the width of the right-side area BM-R is set greater than the width of the left-side area BM-L.

The case (2) shown in FIG. 2 is a case in which the rubbing direction DIR1 of the orientation film of the first substrate SUB1 makes a clockwise acute angle θ in the left downward direction with respect to the video signal line and the rubbing direction DIR2 of the orientation film of the second substrate SUB2 is set to the left upward direction. Here, with respect to the black matrix, the width of the left-side area BM-L is set greater than the width of the right-side area BM-R.

The case (3) shown in FIG. 2 is a case in which the rubbing direction DIR1 of the orientation film of the first substrate SUB1 makes a clockwise obtuse angle θ in the left downward direction with respect to the video signal line and the rubbing direction DIR2 of the orientation film of the second substrate SUB2 is set to the left downward direction. Here, with respect to the black matrix, the width of the right-side area BM-R is set greater than the width of the left-side area BM-L.

The case (4) shown in FIG. 2 is a case in which the rubbing direction DIR1 of the orientation film of the first substrate SUB1 makes a clockwise obtuse angle θ in the left upward direction with respect to the video signal line and the rubbing direction DIR2 of the orientation film of the second substrate SUB2 is set to the right upward direction. Here, with respect to the black matrix, the width of the right-side area BM-R is set greater than the width of the left-side area BM-L.

In this manner, by making the left and right widths of the black matrix which constitute light shielding portions for shielding light at the left and right side of the pixel electrode PIX asymmetrical with respect to the opening of the pixel electrode PIX in response to the clockwise angle θ of rubbing direction which is either the obtuse angle or the acute angle, the generation of the disclination derived from the rubbing direction of the orientation film can be suppressed. As a result, it is possible to obtain the image display of high quality having a large contrast.

Figure 3:
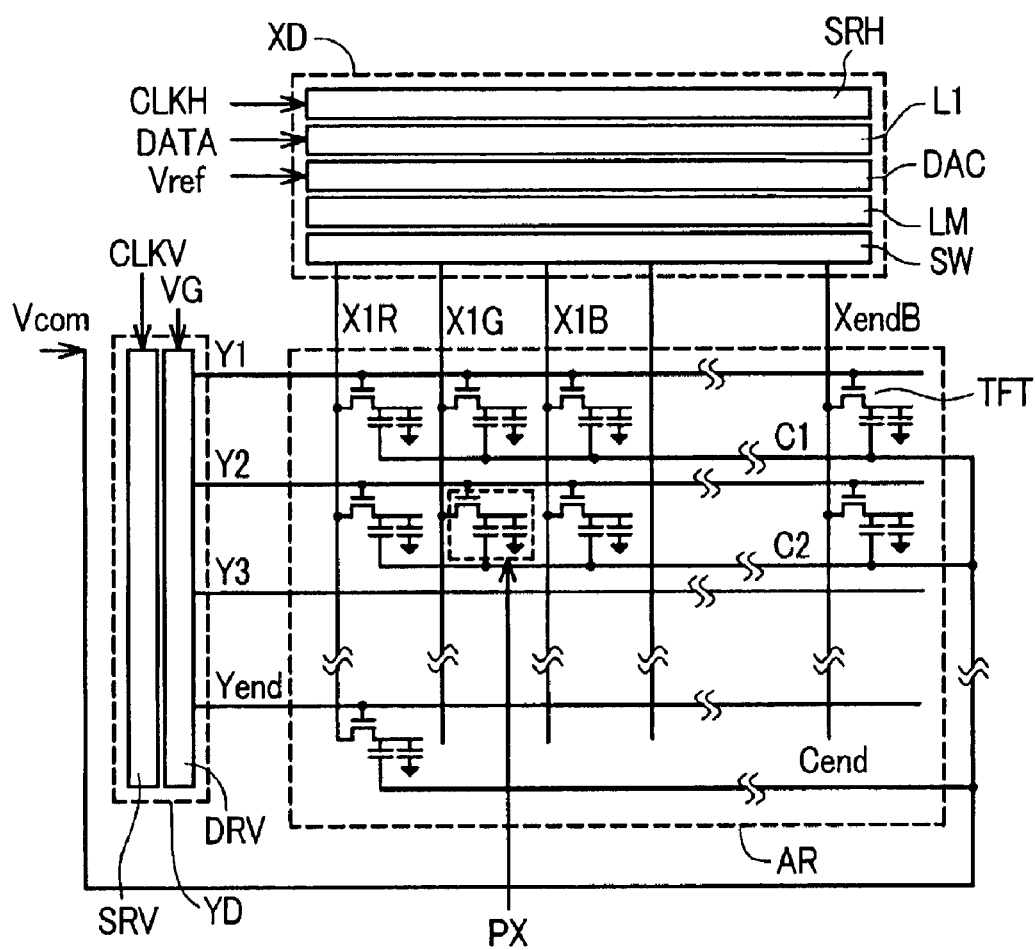
FIG. 3 is a schematic circuit diagram for explaining constitutional examples of the liquid crystal display device to which the present invention is applied.

Here, the typical constitution of the liquid crystal display device of the present invention is explained. FIG. 3 is a schematic circuit chart for explaining a constitutional example of the liquid crystal display device to which the present invention is applied. In the liquid crystal display device, a large number of pixels PX are arranged in a matrix array in an effective display area AR. Each pixel PX includes a thin film transistor TFT which drives a pixel electrode formed on a main surface of a first substrate and a common electrode C which is formed on a main surface of the second substrate. On the main surface of the first substrate, video signal lines X (X1R, X1G, X1B, . . . XendB) and scanning signal lines Y(Y1, Y2, Y3, . . . Yend) are formed. Further, common electrodes C(C1, C2, . . . Cend) are formed on the main surface of the second substrate.

The video signal lines X are driven by a video signal line driving circuit XD and the scanning signal lines Y are driven by a scanning signal line driving circuit YD. The video signal line driving circuit XD is constituted of a horizontal shift register SRH, a latch circuit L1, a digital-analogue converting circuit DAC, a line memory LM and an analogue switching circuit SW. Various types of clock signals CLKH, display data DATA, reference voltages Vref and the like are inputted to the video signal line driving circuit XD from a host computer side and signal voltages for display are outputted to the video signal lines X from the video signal line driving circuit XD.

The scanning signal line driving circuit YD includes a vertical shift register SRV and a vertical driving circuit DRV. Various types of clock signals CLKV and a gate voltage VG are inputted to the scanning signal line driving circuit YD from the host computer side, while the scanning voltage is outputted from the scanning signal line driving circuit YD to the scanning signal lines Y. A common line voltage Vcom is applied to the common electrodes C from the host computer.

Figure 4A:
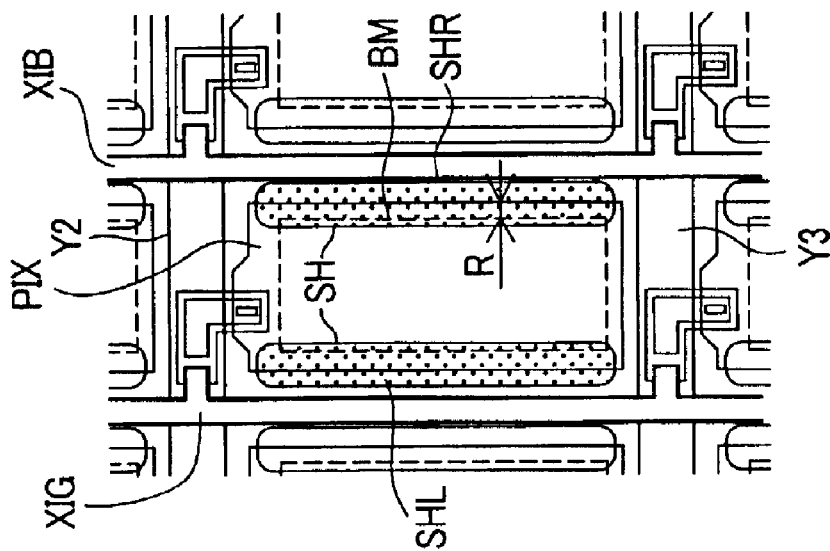
FIG. 4A and FIG. 4B are views showing the pixel arrangement in FIG. 3 and one pixel in an enlarged form.
Figure 4B:
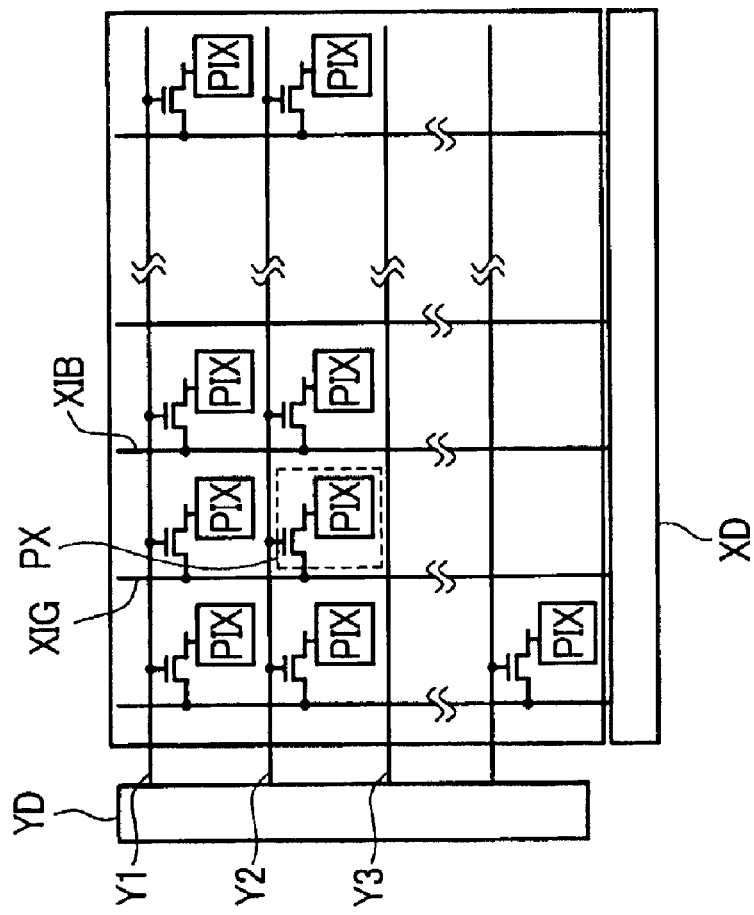

FIG. 4A and FIG. 4B are views showing the pixel arrangement in FIG. 3 and one pixel in an enlarged form. FIG. 4A shows the pixel arrangement, wherein a target pixel PX in the pixel arrangement is shown in an enlarged form in FIG. 4B. The pixel PX includes the pixel electrode PIX driven by the video signal line XIG and forms a light shielding film SHL (left-side light shielding film) and a light shielding film SHR (right-side light shielding film) respectively in the neighborhood between the pixel electrode PIX and the video signal line XIG and in the neighborhood between the pixel electrode PIX and the video signal line XIB.

These light shielding films SHL and SHR are overlapped to the pixel electrode PIX and perform the shielding of light at portions between the left and right end portions of such a pixel electrode PIX and the video signal lines X1G, X1B. Further, the black matrix BM provided to the second substrate side is overlapped to the periphery of the pixel electrode PIX as illustrated by the opening which is indicated by a dashed line in FIG. 4B so as to perform the shielding of light. With the provision of these light shielding films SHL and SHR and the black matrix BM, the leaking of light is prevented thus enhancing the contrast.

Figure 5B:
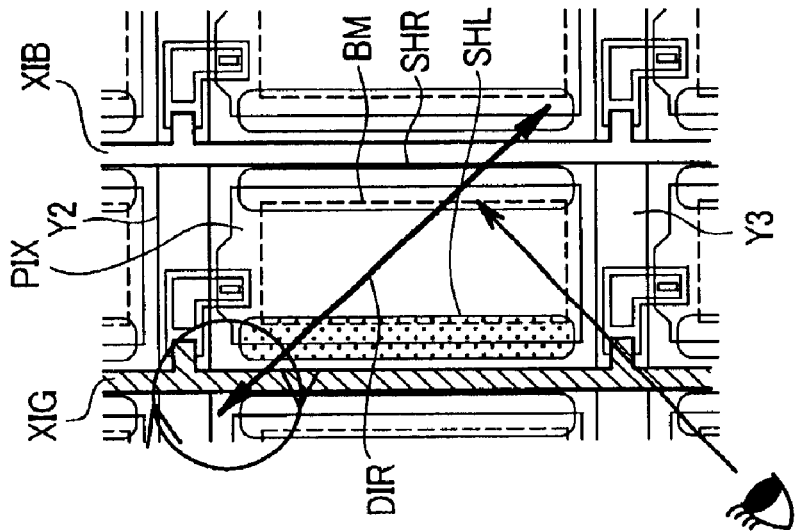
FIG. 5A and FIG. 5B are explanatory views showing the rubbing direction of an orientation film of a first substrate and a first case in which leaking of light from the pixel is generated.
Figure 5A:
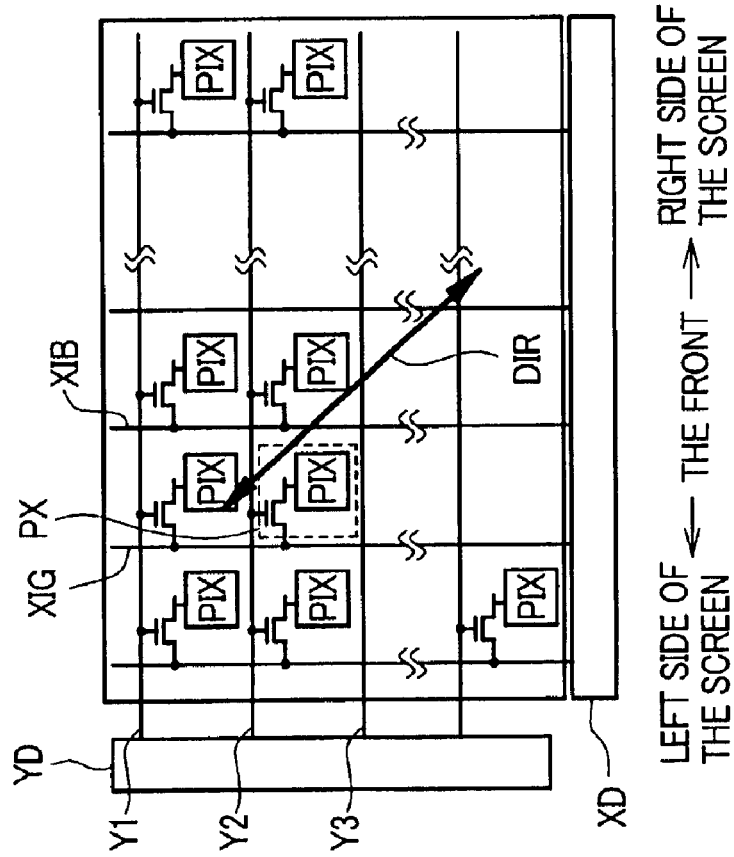

FIG. 5A and FIG. 5B are explanatory views showing the rubbing direction of the orientation film of the first substrate and a first case in which leaking of light from the pixel is generated, FIG. 6A and FIG. 6B are explanatory views showing the rubbing direction of the orientation film of the first substrate and a second case in which leaking of light from the pixel is generated, and FIG. 7A and FIG. 7B are explanatory views showing the rubbing direction of the orientation film of the first substrate and a third case in which leaking of light from the pixel is generated.

The first case which generates the leaking of light as shown in FIG. 5A and FIG. 5B is a case in which the rubbing direction DIR is on a line which connects the left upper portion and the right lower portion of the first substrate. In this case, the leaking of light becomes noticeable at the right side of the pixel when a viewing angle is inclined to the left side with respect to a direction normal to a main surface of the pixel (liquid crystal display panel on which the pixel is formed). Although a viewing line which observes the pixel from the left lower side is illustrated in FIG. 5B, the light leaks from the opening of the black matrix BM or the periphery of a brim of the light shielding film SHR even at such a viewing angle.

The second case which generates the leaking of light as shown in FIG. 6A and FIG. 6B is a case in which the rubbing direction DIR is on a line which connects the left lower portion and the right upper portion of the first substrate. In this case, the leaking of light becomes noticeable at the left side of the pixel when the viewing angle is inclined to the right side with respect to the direction normal to the main surface of the pixel (liquid crystal display panel on which the pixel is formed). Although a viewing line which observes the pixel from the right lower side is illustrated in FIG. 6B, the light leaks from the opening of the black matrix BM or the periphery of a brim of the light shielding film SHL even at such a viewing angle.

The third case which generates the leaking of light as shown in FIG. 7A and FIG. 7B is a case in which the first substrate shown in FIG. 5A (rubbed in the direction from the left upper portion to the right lower portion or in the direction from the right lower portion to the left upper portion) is observed in a state that the first substrate is rotated by 180° and hence, the rubbing direction DIR is on a line which connects the right lower portion and the left upper portion of the first substrate. In this case, the leaking of light becomes noticeable at the left side of the pixel when the viewing angle is inclined to the right side with respect to the direction normal to the main surface of the pixel (liquid crystal display panel on which the pixel is formed). Although a viewing line which observes the pixel from the right lower side is illustrated in FIG. 7B, the light leaks from the opening of the black matrix BM or the periphery of a brim of the light shielding film SHL even at such a viewing angle.

Figure 8:
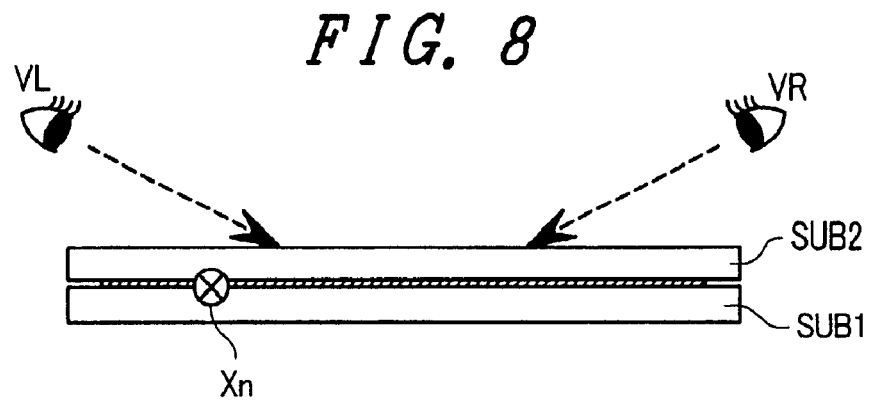
FIG. 8 is an explanatory view collectively showing observation results of leaking of light based on findings of FIG. 5A to FIG. 7B.

FIG. 8 is an explanatory view which collectively arranges the observation results of the leaking of light based on the findings shown in FIG. 5A to FIG. 7B. The liquid crystal display device is constituted by overlapping two substrates (SUB1, SUB2) and a video signal line Xn is formed in the direction shown in FIG. 8 (in the direction from a front surface to a back surface of a paper surface). When the liquid crystal display device is observed from a left-side viewing point VL, the leaking of light is noticeable in the above-mentioned first case and is hardly noticeable in the above-mentioned second case and third case. To the contrary, when the liquid crystal display device is observed from a right-side viewing point VR, the leaking of light is noticeable in the above-mentioned second case and third case and is hardly noticeable in the above-mentioned first case.

Figure 9A:
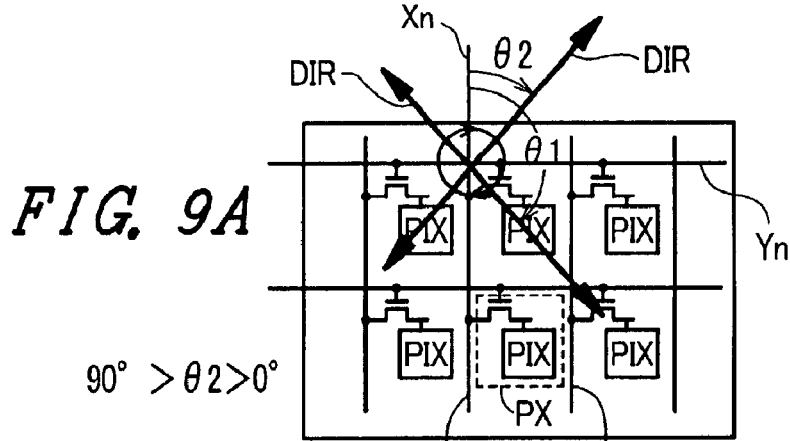
FIG. 9A to FIG. 9C are explanatory views for explaining constitutions in which the left and right widths of a light shielding portion of the pixel are made asymmetrical in accordance with the rubbing direction of the orientation film.
Figure 9B:
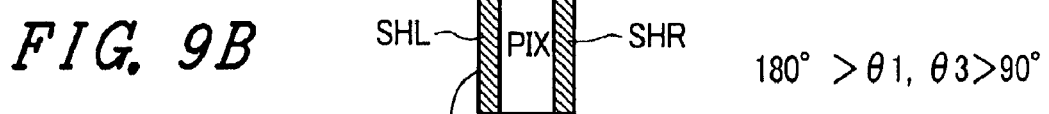
Figure 9C:
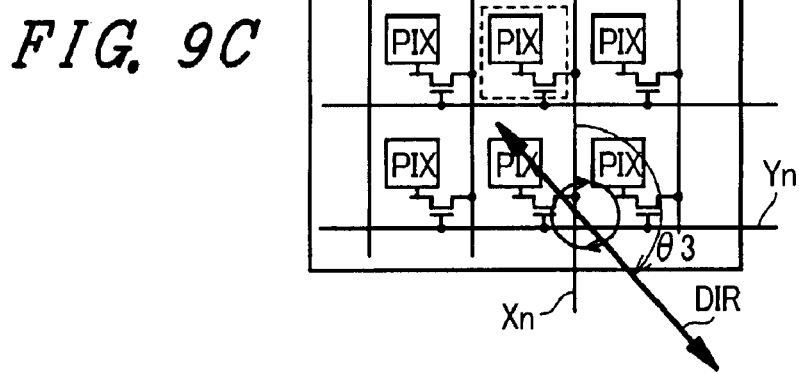

As mentioned above, the present invention is characterized in that the left and right widths of the light shielding portions formed along the video signal lines of the pixel are made asymmetrical. FIG. 9A to FIG. 9C are explanatory views for explaining constitutions in which the left and right widths of the light shielding portions of the pixel are made asymmetrical in accordance with the rubbing direction of the orientation film. Here, although the explanation is made taking the case in which light shielding films constitute the light shielding portion as an example, the same goes for a case in which the black matrix constitutes the light shielding portions. FIG. 9A is the explanatory view of the rubbing direction of the orientation film in the first case and the second case, FIG. 9B is the explanatory view of the light shielding films SHL, SHR provided at left and right sides of the pixel electrode PIX, and FIG. 9C is the explanatory view of the rubbing direction of the orientation film in the third case.

Intersecting angles θ1, θ2 of the rubbing directions DIR in the clockwise direction with respect to the video signal line Xn shown in FIG. 9A correspond to the first case and the second case, while an intersecting angle θ3 of the rubbing direction DIR in the clockwise direction with respect to the video signal line Xn shown in FIG. 9C corresponds to the third case. In the first case, the width of the light shielding film at the video signal line side which does not contribute to the driving of the target pixel PIX is set greater than the width of the light shielding film at the video signal line side which contributes to the driving of the target pixel PIX.

In the second case, the width of the light shielding film at the video signal line side which contributes to the driving of the target pixel PIX is set greater than the width of the light shielding film at the video signal line side which does not contribute to the driving of the target pixel PIX. In the third case, the width of the light shielding film at the video signal line side which does not contribute to the driving of the target pixel PIX is set greater than the width of the light shielding film at the video signal line side which contributes to the driving of the target pixel PIX.

Figure 10A:
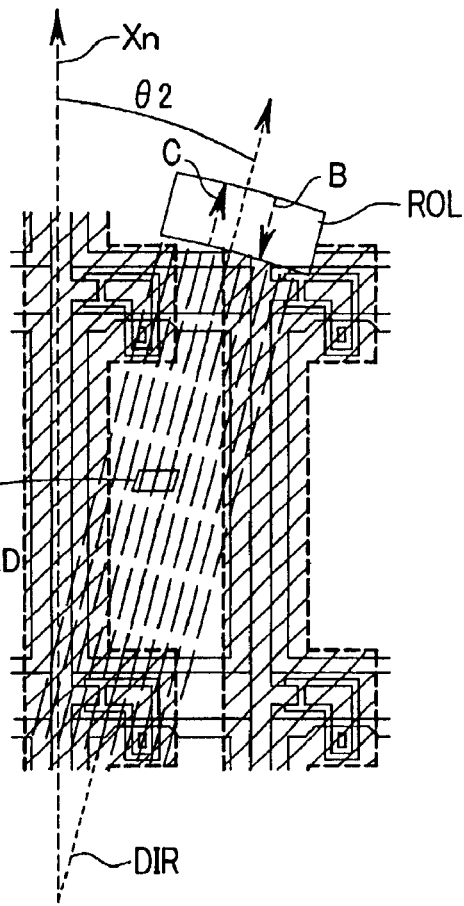
FIG. 10A and FIG. 10B are explanatory views showing one example of the rubbing of the orientation film provided to the first substrate and the rubbing direction with respect to the video signal line and a shape of the rubbed orientation film.
Figure 10B:
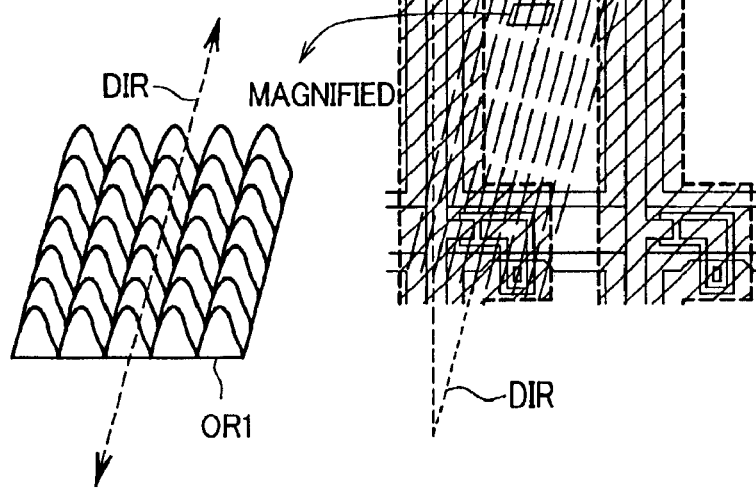
Figure 11:
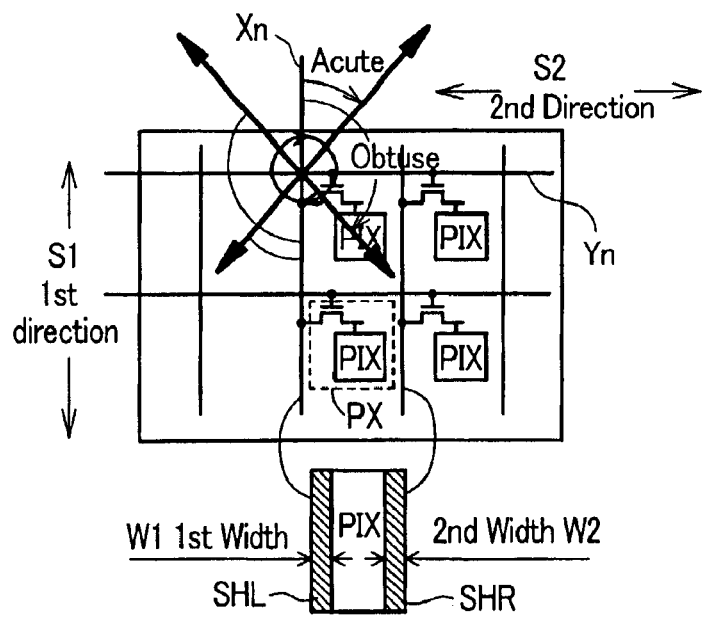
FIG. 11 is an explanatory view showing the rubbing directions and the setting of the asymmetrical widths of the light shielding film which are formed at left and right sides of the pixel electrode.

FIG. 10A and FIG. 10B are explanatory view for explaining the rubbing treatment applied to the first substrate SUB1 and the direction of the rubbing treatment. FIG. 11 is an explanatory view for explaining the relationship between the rubbing direction and the widths (size in the direction which intersects the video signal line) of light shielding areas (light shielding films) formed respectively at left and right sides (both ends along the video signal line) of the pixel electrode. FIG. 10A shows one Xn of video signal lines and one of the pixel electrodes receiving the video signal from the video signal line which are formed on the main surface of the first substrate SUB1. FIG. 10A also schematically explains the rubbing treatment applied to the pixel electrode. Although not shown in FIG. 10A, an orientation film is formed such that the orientation film covers the pixel electrode shown in FIG. 10A and a periphery thereof (For example, the orientation film covers the whole area of FIG. 10A).

The orientation film is formed of organic material (resin) such as polyimide. The rubbing treatment is performed such that a bristled roller (rubbing roller) ROL which is wrapped with a cloth such as a buff textile is moved on the orientation film in the linear direction (along the rubbing direction DIR) while rotating the bristled roller ROL in the direction of an arrow B or C. As a result, a surface of the orientation film ORI is rubbed by piles of the cloth of the rubbing roller and recesses shown in FIG. 10B which are extended along the rubbing direction DIR are formed. FIG. 10B illustrates an image obtained by observing the orientation film after the rubbing treatment using an atomic force microscope (AFM).

As shown in FIG. 11, depending on whether the intersecting angle in the clockwise direction which is made between the rubbing direction DIR and the extension direction (first direction) of the video signal line Xn is an obtuse angle or an acute angle, the width of the light shielding film SHL (first width) and the width of the light shielding film SHR (second width) formed at left and right sides of the pixel electrode PIX are changed. Accordingly, the leaking of light in the left and right direction, particularly in a viewing angle of left and right oblique direction can be suppressed so that it is possible to provide images of high quality by enhancing the contrast. Further, the influence of the lateral electric field which is generated between the video signal line and the pixel electrode can be made uniform between the left and right sides of the pixel and hence, it is possible to obtain bright images without lowering the numerical aperture and without increasing the brightness of an external light source for illumination.

Figure 12:
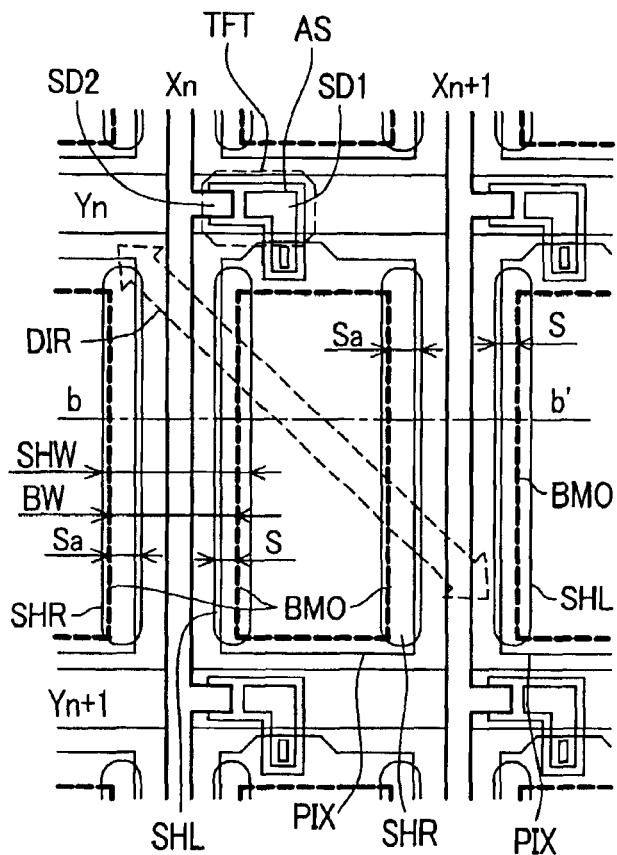
FIG. 12 is a schematic view showing the pixel structure in an enlarged form to explain the constitution of the second embodiment of the liquid crystal display device according to the present invention and also is an explanatory view showing the present invention applied to the first case.
Figure 13:
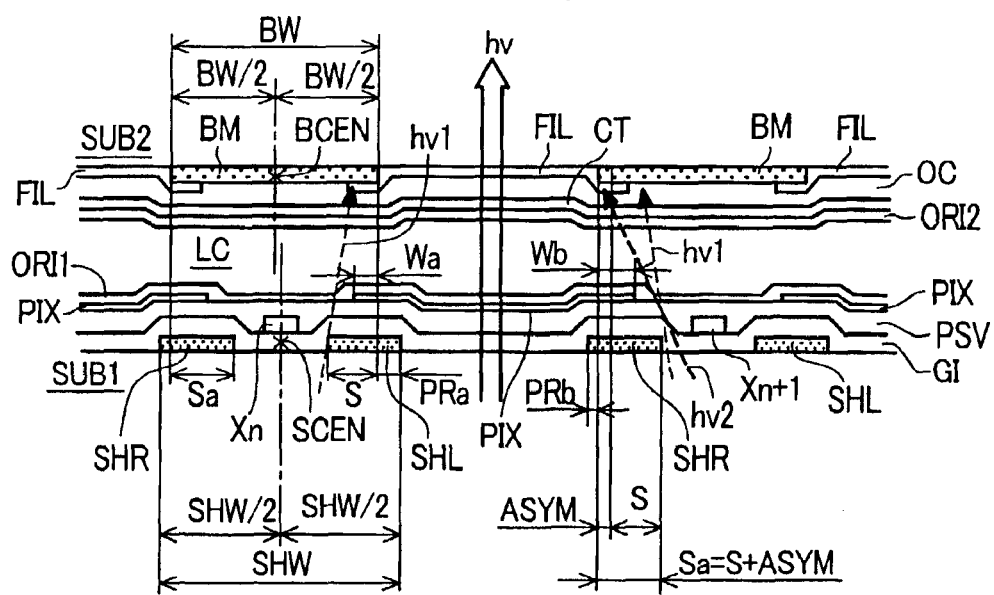
FIG. 13 is a cross-sectional view taken along a line b–b' of FIG. 12.
Figure 14:
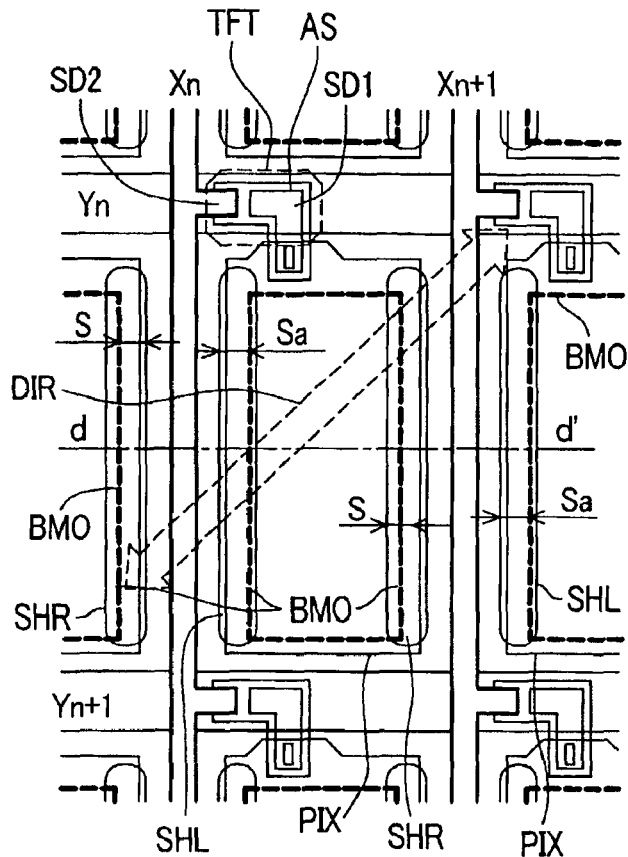
FIG. 14 is a schematic view showing the pixel structure in an enlarged form to explain the constitution of the second embodiment of the liquid crystal display device according to the present invention and also is an explanatory view showing the present invention applied to the second case.
Figure 15:
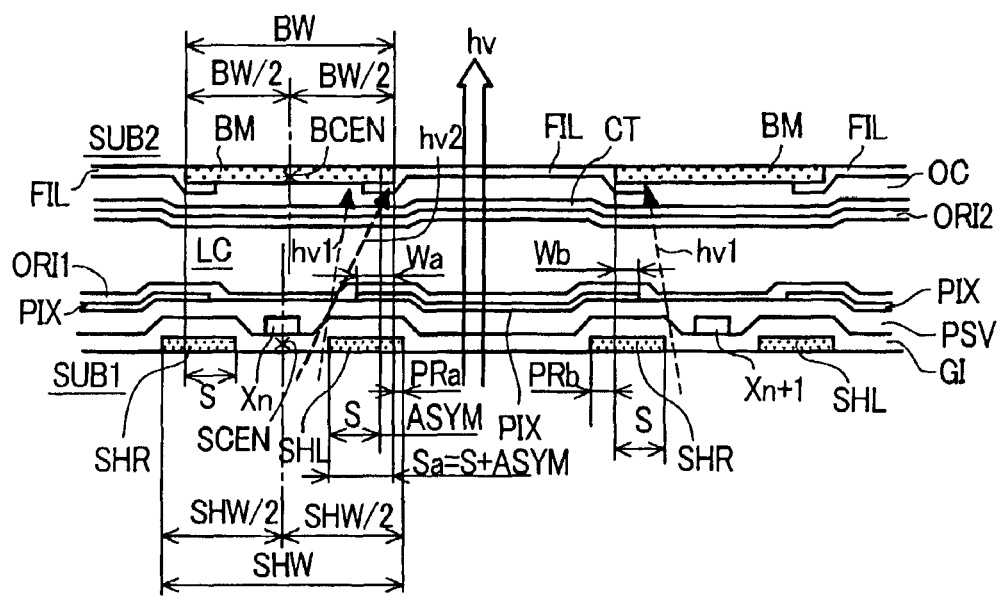
FIG. 15 is a cross-sectional view taken along a line d–d' of FIG. 14.

FIG. 12 is a view showing a pixel structure of the second embodiment of the liquid crystal display device of the present invention, wherein a pixel and a periphery thereof is shown in an enlarged form. FIG. 12 is also a plan view of the pixel structure to which the above-mentioned first case is applied. FIG. 13 is a cross-sectional view taken along a line b–b' of FIG. 12. FIG. 14 is a plan view of the pixel structure of the second embodiment of the liquid crystal display device of the present invention to which the above-mentioned second case is applied. FIG. 15 is a cross-sectional view taken along a line d–d' of FIG. 14. With respect to constitutional elements which are shown in either FIG. 12 or FIG. 14, except that an opening BMO of a black matrix indicated by a bold dashed line is formed in the above-mentioned second substrate SUB2 (also referred to as a color filter substrate when a color filter is formed within a frame of the opening BMO), all constitutional elements are formed on the above-mentioned first substrate SUB1. The constituent elements shown in the plan views of FIG. 12 and FIG. 14 and the cross-sectional views of FIG. 13 and FIG. 15 are substantially equal except that they differ in the asymmetry of the widths of the black matrix BM which covers the left and right sides (both ends along the video signal lines Xn, Xn+1) of the pixel electrode PIX.

In the plan views of FIG. 12 and FIG. 14, on the main surface of the first substrate SUB1, a plurality of video signal lines Xn, Xn+1 extending in the upward and downward direction (first direction) are arranged in parallel in the left and right direction (second direction which intersects the first direction), while a plurality of scanning signal lines Yn, Yn+1 extending in the left and right direction (above-mentioned second direction) are arranged in parallel in the upward and downward direction (above-mentioned first direction). With respect to these two signal lines, the video signal lines supply the video signals to the pixels and the scanning signal lines supply separate signals which control the supply of the video signals to the pixels.

The above-mentioned signal lines according to the asymmetrical light shielding structure of the pixel of the present invention indicate the video signal lines which are shown in FIG. 12 to FIG. 15. The length of the end portions of the pixel electrode along which the video signal lines are extended are greater than the length of the pixel electrode along which the scanning signal lines are extended. With respect to the pixel structures of the second embodiment, one of such pixel structures is constituted in a form that the pixel structure includes a pixel electrode PIX which is formed in an area which is surrounded by a pair of neighboring video signal lines Xn, Xn+1 out of a plurality of above-mentioned video signal lines and a pair of neighboring scanning signal lines Yn, Yn+1 out of a plurality of above-mentioned scanning signal lines and a switching element (illustrated as a field effect thin film transistor) TFT which supplies the video signals to the pixel electrode PIX.

Either one of the pixel electrodes shown in FIG. 12 and FIG. 14 receives the signals supplied from the video signal line Xn through the thin film transistor TFT depicted by a surrounding frame of a dashed line. The thin film transistor TFT includes a portion of one scanning signal line Yn out of a plurality of scanning signal lines (or a conductive layer branched from one portion), an insulation film (gate insulation film) GI and a semiconductor layer AS which are laminated onto such one portion of the scanning signal line (or the conductive layer branched from one portion), and a pair of electrode layers SD1, SD2 which are formed on the semiconductor layer AS in a spaced-apart manner from each other with a given gap therebetween.

One portion (or the conductive layer branched from one portion) of the scanning signal line is also referred to as "gate electrode". By utilizing an electric field generated on the semiconductor layer AS (also referred to as "channel") to which a pair of electrode layers SD1, SD2 are connected, upon applying of a voltage to the gate electrode, a conductive path between the video signal line Xn and the pixel electrode PIX is opened or closed. By forming the conductive layer which is referred to as "gate electrode" using material having light shielding characteristics such as metal, alloy or the like, it is possible to suppress the entrance of light from a light source which is arranged at a back surface (a main surface opposite to a main surface on which the pixel electrodes and the like are formed) side of the first substrate into the semiconductor layer AS formed on the gate electrode and the photo conduction which is generated in the inside of the semiconductor layer AS derived from the incident light.

One electrode layer SD2 out of a pair of the above-mentioned electrode layers is connected to the video signal line Xn and also constitutes a portion of the video signal line Xn. The other electrode layer SD1 out of a pair of the above-mentioned electrode layers is connected to the pixel electrode PIX. Assume that the thin film transistor TFT is formed of the field effect transistor, a pair of electrode layers SD1, SD2 are respectively referred to as "source electrode" and "drain electrode". However, when the liquid crystal display device is driven by periodically changing the polarity of the video signals supplied to the liquid crystal display panel, both electrode layers SD1, SD2 alternately perform a function of the source electrode and a function of the drain electrode.

In the second embodiment of the liquid crystal display device of the present invention, on the main surface of the first substrate SUB1, a plurality of pixel structures having either one of the pixel structures illustrated in FIG. 12 and FIG. 14 are arranged two-dimensionally in the upward and downward direction as well as in the left and right direction. Such an arrangement can be easily estimated since, in both plan views of FIG. 12 and FIG. 14, other eight pixel structures are shown such that these pixel structures surround the illustrated pixel structure.

For example, in FIG. 12 and FIG. 14, other two neighboring pixel structures arranged at left and right sides of the pixel structure illustrated at the center of each drawing have the same structure as that of the illustrated pixel structure and the video signals are supplied to the pixel electrodes PIX formed on these pixel structures from respectively different video signal lines (video signal line Xn+1 in the right-side pixel structure) through other thin film transistors formed on the scanning signal lines Yn.

Accordingly, with respect to the pixel electrode PIX of the pixel structure which is illustrated at each center of FIG. 12 or FIG. 14, one video signal line Xn out of a pair of video signal lines Xn, Xn+1 arranged at left and right sides (both sides) of the pixel electrode contributes to the driving of the pixel electrode PIX and the other video signal line Xn+1 does not directly contribute to the driving of the pixel electrode PIX (here, parasitic capacitance or the like which is generated between the pixel electrode PIX and the video signal line Xn+1 being ignored).

The arrangement of such pixel electrodes PIX, the video signal lines Xn, Xn+1 or equivalents of those constitutional elements is also applicable to a liquid crystal display device which uses thin film diodes (TFD) in place of the above-mentioned thin film transistors as switching elements which control the supply of video signals to the pixel electrodes PIX.

The respective pixel structures illustrated in FIG. 12 and FIG. 14 are explained in further detail in conjunction with cross-sectional views of FIG. 13 and FIG. 15. On the main surface of the first substrate SUB1, together with a plurality of the above-mentioned scanning signal lines Yn, Yn+1, the light shielding films SHL, SHR are formed such that the light shielding films SHL, SHR are overlapped to the left and right peripheries of the pixel electrode PIX of each pixel while sandwiching the insulation film GI therebetween. The light shielding films SHL, SHR may be electrically connected to or integrally formed with the scanning signal line which does not contribute to the driving of the pixel electrode PIX which is overlapped to the light shielding films SHL, SHR (scanning signal line Yn+1 with respect to the pixel structure PIX illustrated at the center of FIG. 12 and FIG. 14).

The scanning signal line which does not contribute to the driving of the pixel electrode PIX illustrated at the center of FIG. 12 and FIG. 14 can be also defined as a scanning signal line which contributes to the driving of neighboring other pixel electrode adjacent to either the upper side or the lower side of the pixel electrode PIX. As mentioned above, to take into consideration that the portions of the scanning signal lines Yn, Yn+1 are used as the gate electrodes, it is desirable that the scanning signal lines Yn, Yn+1 and the light shielding films SHL, SHR are formed of metal or an alloy having light transmissivity lower than that of the first substrate SUB1 or the insulation film GI using the same film forming step.

Further, from a viewpoint of forming the light shielding films SHL, SHR along the video signal lines Xn, Xn+1, it is preferable to form the light shielding films SHL, SHR together with the scanning signal lines Yn, Yn+1 and to sandwich the insulation film GI between the scanning signal lines Yn, Yn+1 and the video signal lines Xn, Xn+1. When the light shielding films SHL, SHR are formed of a conductive layer, to suppress the generation of the parasitic capacitance between the light shielding films SHL, SHR and the video signal lines Xn, Xn+1, it is desirable to separately form the light shielding films SHL, SHR arranged at both sides of each video signal line (for example, Xn) without integrally forming the light shielding films SHL, SHR.

Further, it is preferable to form gaps which are arranged along the main surface of the first substrate SUB1 between respective video signal lines and respective light shielding films SHL, SHR which are arranged at both sides of the video signal line. Another separate insulation film (referred to as a protective film or a passivation film) PSV is formed on the video signal lines Xn, Xn+1. The insulation film levels recessed portions or projections on an uppermost surface of the first substrate SUB1 which are generated at the time of forming the scanning signal lines, the light shielding films, the video signal lines and the switching elements so as to flatten the undulation of the surface of the pixel electrode PIX and the orientation film ORI1 formed on the insulation film as much as possible.

Due to such a constitution, the local irregularities of an electric field applied to the liquid crystal layer LC from the pixel electrode PIX and the irregularities of the orientation state of the liquid crystal molecules derived from the orientation film ORI1 can be reduced. The above-mentioned video signal lines Xn, Xn+1 and the electrode layers SD1, SD2 which form the above-mentioned switching elements may preferably be made of material having low electric resistance such as metal, an alloy or the like. It is preferable that the pixel electrode PIX is formed of conductive oxide material having high light transmissivity such as indiumtin-oxide (ITO) and indium-zinc-oxide (IZO). Accordingly, it is preferable to form the electrode layer SDI which is bonded to the pixel electrode PIX through a contact hole formed in the insulation film PSV using material which can suppress the electric resistance at a bonding interface between the conductive oxide material and the electrode layer SDI.

On the other hand, as shown in the cross-sectional views of FIG. 13 and FIG. 15, on the main surface of the second substrate SUB2, the black matrix BM which is formed of resin material, metal or an alloy having the lower light transmissivity compared to the second substrate SUB2 is formed. Corresponding to the pixel electrodes PIX formed on the first substrate SUB1, openings are formed in the black matrix BM. In the liquid crystal display device which performs the color image display, color filter layers FIL are formed such that they are embedded into respective openings formed in the black matrix BM. The black matrix BM is formed of a metal film (having a sufficient thickness to obtain a light shielding effect) or resin in which dye, pigment or carbon is dispersed.

The color filters FIL are formed such that colored resins are sequentially formed for respective colors or resin layers are preliminarily formed and dyes or pigments are dispersed in these resin layers. Due to such formation of the black matrix BM, the formation of the openings and the formation of the color filters FIL in these openings, an undulation is generated on an upper surface of the second substrate SUB2. To level such an undulation, an insulation film (also referred to as "overcoat film") OC is formed such that the insulation film OC covers the black matrix BM, the openings formed in the black matrix BM and the color filter layers FIL embedded into these openings. On the insulation film OC, a counter electrode CT which generates an electric field in the inside of the liquid crystal layer LC together with respective pixel electrodes PIX and an orientation film ORI2 are formed.

The counter electrode CT is formed in a size which allows the counter electrode CT face a plurality of the above-mentioned pixel electrodes PIX in an opposed manner, for example. The fluctuation of a potential of the counter electrode CT is small compared to a potential of the pixel electrodes PIX which is fluctuated in response to the video signals. Accordingly, a voltage applied to the counter electrode CT is also referred to as a reference voltage or a common voltage, while the counter electrode is referred to as a common electrode. The rubbing treatment is applied to the orientation film ORI2 in the same manner as the orientation film ORI1 provided to the first substrate SUB1 as explained in conjunction with FIG. 10.

Although the above-mentioned insulation films GI, PSV and OC are respectively formed of inorganic materials such as silicon nitride (SiNx), silicon oxide (SiOx), aluminum oxide ($Al_2O_3$), tantalum oxide ($TaO_5$) or the like, the insulation films PSV, OC may be formed of organic material (resin).

Subsequently, the pixel structure which is formed in conformity with the above-mentioned first case illustrated in FIG. 12 and FIG. 13 and the pixel structure which is formed in conformity with the above-mentioned second case illustrated in FIG. 14 and FIG. 15 are explained. In plan views (FIG. 12 and FIG. 14) of respective pixel structures, the direction DIR of the rubbing treatment (the shifting direction of the above-mentioned rubbing roller) which is applied to the main surface of each first substrate is indicated by an arrow framed with a dashed line.

In FIG. 12, the rubbing direction DIR is depicted such that the illustrated video signal line Xn is rotated in the clockwise direction by 135°. That is, FIG. 12 corresponds to the above-mentioned first case in which the rubbing direction DIR intersects the video signal line Xn while making an angle of approximately 135° (that is, an obtuse angle) in the clockwise direction with respect to the video signal line Xn. In FIG. 14, the rubbing direction DIR is depicted such that the illustrated video signal line Xn is rotated in the clockwise direction by 45°. That is, FIG. 14 corresponds to the above-mentioned second case in which the rubbing direction DIR intersects the video signal line Xn while making an angle of approximately 45° (that is, an acute angle) in the clockwise direction with respect to the video signal line Xn.

With respect to the pixel structure in conformity with the above-mentioned first case which is illustrated in FIG. 12 and FIG. 13, to focus on the pixel electrode PIX shown at the center of the FIG. 12, it is requested to perform the light shielding of the right-side periphery more sufficiently than the light shielding of the left-side periphery. In respectively overlapping the light shielding layers SHL, SHR to the left and right (both side) peripheries of the pixel electrode PIX on the main surface of the first substrate SUB1 and shielding light leaked from the peripheries of the pixel electrode PIX using these light shielding layers SHL, SHR and the opening (brim of the opening being indicated by BMO) of the black matrix BM formed on the main surface of the second substrate SUB2, the light shielding layers SHL, SHR and the black matrix BM are arranged to overlap each other along the left and right direction (second direction which intersects the above-mentioned first direction along which the video signal line extends) at least by the width S. The reasons is as follows.

In an image display performed by the liquid crystal display device, light hv which passes through the pixel electrode PIX shown at the center of FIG. 12 and FIG. 14, the liquid crystal layer LC and the counter electrode CT is indicated by an arrow shown in FIG. 13. The liquid crystal molecules in the liquid crystal layer LC through which the light hv passes are oriented by the orientation films ORI1, ORI2 (a so-called initial orientation state in which the electric field is not applied to the liquid crystal layer LC) and the liquid crystal molecules are gradually released from the initial orientation state in response to the strength of electric field generated between the pixel electrode PIX and the counter electrode CT so that the transmissivity of the light hv in the liquid crystal layer LC is changed.

However, light hv1 which is incident on the liquid crystal display panel with an inclination from a normal direction of the main surface of the first substrate SUB1 is incident on the liquid crystal layer LC through a gap between the light shielding layer SHL and the video signal line Xn which are formed in the above-mentioned manner and a gap between the light shielding layer SHR and the video signal line Xn+1 which are formed in the above-mentioned manner. When the liquid crystal display device is driven in a normally white (also referred to as "normally open", wherein the smaller an electric field applied to the liquid crystal layer LC, the light transmissivity of the liquid crystal layer LC is increased), an electric field similar to the electric field generated between the pixel electrode PIX and the counter electrode CT is not generated at least at portions of the liquid crystal layer LC on which the light hv1 is incident and hence, irrespective of the potential of the pixel electrode PIX, the light hv1 passes through the liquid crystal layer LC and is irradiated to the outside of the liquid crystal display panel through the openings of the black matrix BM.

By having the respective light shielding films SHL, SHR overlapped to the black matrix by the width S, it is possible to shield the light hv1 which becomes a cause of leaking of light at both left and right sides of the pixel electrode PIX using the black matrix BM. In FIG. 13, the width S is set to a value equal to or more than a width that which interrupts the light hv is in view of the following consideration. That is, the width S is set in view of the misalignment of the main surface of the first substrate SUB1 and the main surface of the second substrate SUB2 at the time of assembling the liquid crystal display panel and the exposure error which is generated within the main surface of either one of substrates (for example, the difference in size of the transfer patterns at the center and the periphery of the main surface of the substrate which is generated by aberration of an exposure device) in the photolithography process for forming the light shielding films SHL, SHR and the like on the main surface of the first substrate SUB1 and the openings BMO of the black matrix BM in the main surface of the second substrate SUB2.

Conventionally, it has been considered that the leaking of light is generated at both left and right sides of the pixel electrode PIX in the same manner as in the case of the light hv1 shown in FIG. 13. However, the inventors have found that the leaking of light which can be expressed as the light hv2 is generated at the right side of pixel electrode PIX of the liquid crystal display panel corresponding to the above-mentioned first case, that is, at the periphery along the signal line which has no direct relationship with the supply of the video signals to the pixel electrode. This light hv2 is, as can be clearly understood from FIG. 13, not shielded even when the black matrix BM and the light shielding film SHR are overlapped with the width S in the same manner as the conventional method. Accordingly, the inventors have increased the overlapping width of the black matrix BM and the light shielding film SHR by a width ASYM.

As a result, the overlapping width of the black matrix BM and the light shielding film SHR shown in the drawing becomes Sa (here, Sa=S+ASYM) and the brim BMO of the opening of the black matrix BM which faces the right-side periphery of the pixel electrode PIX is projected toward the center of the pixel electrode PIX by an amount of ASYM in FIG. 13.

The features of the pixel structure of the embodiment 2 according to the present invention which corresponds to the above-mentioned first case shown in FIG. 12 and FIG. 13 are described as follows.

Structural Feature 1:

The liquid crystal display device comprises the first substrate SUB1 having the main surface on which a plurality of signal lines, the pixel electrodes PIX each of which is sandwiched by a pair of neighboring signal lines out of the plurality of signal lines and receives video signals from one Xn of the pair of signal lines, the first light shielding film SHL which is overlapped to the periphery of the pixel electrode PIX along one Xn of the pair of signal lines and extends along the extending direction of the signal line, and the second light shielding film SHR which is overlapped to the periphery of the pixel electrode PIX along the other Xn+1 of the pair of signal lines and extends along the extending direction of the signal line are formed, and the second substrates SUB2 having the main surface on which the black matrix BM having the openings which face the above-mentioned pixel electrodes in an opposed manner is formed.

In the liquid crystal display device having such a constitution, the above-mentioned black matrix BM faces the above-mentioned first light shielding film SHL and the above-mentioned second light shielding film SHR respectively. The overlapping width Sa (for example, defined as a size along the direction perpendicular to the extending direction of the above-mentioned signal lines) of the black matrix BM and the second light shielding film SHR when the black matrix BM is projected to the second light shielding film SHR (along the thickness direction of either one of the above-mentioned substrates) is set wider than the overlapping width S (for example, defined in the same manner as the above-mentioned width Sa) of the black matrix BM and the first light shielding film SHL when the black matrix BM is projected to the first light shielding film SHL.

At least one pixel which satisfies such a condition may be formed on the display screen (effective display area) of the liquid crystal display device. Further, it is preferable that a group of pixels (particularly pixels formed in the vicinity of the center of the display screen) occupying at least equal to or more than 10% of the total number of pixels which constitute the display screen satisfy such a condition.

Structural Feature 2:

The liquid crystal display device comprises the first substrate SUB1 having the main surface on which a plurality of signal lines which extend in the first direction and are arranged in parallel in the second direction which intersects the first direction and a plurality of pixels which are arranged in a row along the first direction between every pair of neighboring signal lines out of the plurality of signal lines are formed, and the second substrate SUB2 having the main surface on which the black matrix BM having a plurality of openings which respectively face the plurality of pixels in an opposed manner respectively is formed, wherein each pixel includes the pixel electrode PIX which receives video signals from one Xn of the pair of signal lines which sandwich the pixel, the first light shielding film SHL which is overlapped to the periphery of the pixel electrode along one Xn of the pair of signal lines and extends along the extending direction of the signal lines and the second light shielding film SHR which is overlapped to the periphery of the pixel electrode along the other Xn+1 of the pair of signal lines and extends along the extending direction of the signal line.

In the liquid crystal display device having such a constitution, the center BCEN of the distance BW defined between a pair of spaced-apart openings out of the plurality of openings of the black matrix BM which respectively correspond to the neighboring pair of pixels along the second direction out of the plurality of pixels is offset to the other side of the pair of pixels (offset to the second light shielding film SHR side which is formed on the other of the pair of the pixels) from the center SCEN of the distance SHW between an end portion of the first light shielding film SHL formed on one of the pair of neighboring pixels (the pixel electrode PIX formed in the pixel being overlapped to the end portion) and an end portion of the second light shielding film SHR which is formed on the other of the pair of pixels and is disposed adjacent to the first light shielding film SHL of one of the pair of pixels (another pixel electrode PIX which is different from the above-mentioned pixel electrode formed on the pixel being overlapped to the end portion).

This feature appears when both of the pixel shown at the center of FIG. 12 and FIG. 13 and the separate pixel formed at the left side of such a pixel have the structure according to the present invention.

Structural Feature 3:

The liquid crystal display device comprises the first substrate SUB1 having the main surface on which a plurality of signal lines and pixel electrodes PIX each of which is formed between a pair of neighboring signal lines Xn, Xn+1 out of the plurality of signal lines and receives the video signals from one Xn of the pair of signal lines are formed, and the second substrate SUB2 having the main surface on which the black matrix BM having openings which face the above-mentioned pixel electrodes in an opposed manner is formed.

In the liquid crystal display device having such a constitution, the openings of the black matrix BM are formed such that the black matrix BM is overlapped to the first periphery of the above-mentioned pixel electrode PIX along one Xn of the above-mentioned pair of signal lines and the second periphery of the above-mentioned pixel electrode PIX along the other Xn+1 of the pair of signal lines. Further, the overlapping width Wa of the black matrix BM and the first periphery of the pixel electrode PIX when the above-mentioned black matrix BM is projected to the first periphery of the above-mentioned pixel electrode PIX (along the thickness direction of either one of the above-mentioned substrates) is set wider than the overlapping width Wb of the black matrix BM and the second periphery of the pixel electrode PIX when the above-mentioned black matrix BM is projected to the second periphery of the above-mentioned pixel electrode PIX. The above-mentioned overlapping widths are, for example, defined as a size in the direction perpendicular to the extending direction of the signal lines.

With respect to the pixel structure in conformity with the above-mentioned second case illustrated in FIG. 14 and FIG. 15, the problem on the leaking of light which the inventors of the present invention have found can be explained in the same manner as the above-mentioned first case by changing the incident position of the light hv2 to the light shielding film SHL side. Accordingly, the structural features of the second case can be described as follows.

Structural Feature 4:

The liquid crystal display device comprises the first substrate SUB1 having the main surface on which a plurality of signal lines, the pixel electrodes PIX each of which is sandwiched by a pair of neighboring signal lines out of the plurality of signal lines and receives video signals from one Xn of the pair of signal lines, the first light shielding film SHL which is overlapped to the periphery of the pixel electrode PIX along one Xn of the pair of signal lines and extends along the extending direction of the signal line, and the second light shielding film SHR which is overlapped to the periphery of the pixel electrode PIX along the other Xn+1 of the pair of signal lines and extends along the extending direction of the signal line are formed, and the second substrates SUB2 having the main surface on which the black matrix BM having the openings which face the above-mentioned pixel electrodes in an opposed manner is formed.

In the liquid crystal display device having such a constitution, the above-mentioned black matrix BM faces the above-mentioned first light shielding film SHL and the above-mentioned second light shielding film SHR, respectively. The overlapping width Sa of the black matrix BM and the first light shielding film SHL when the black matrix BM is projected to the first light shielding film SHL (along the thickness direction of either one of the above-mentioned substrates) is set wider than the overlapping width S of the black matrix BM and the second light shielding film SHR when the black matrix BM is projected to the second light shielding film SHR. The overlapping width can be defined in the same manner as the overlapping width of the above-mentioned structural feature 1.

At least one pixel which satisfies such a condition may be formed on the display screen (effective display area) of the liquid crystal display device. Further, it is preferable that a group of pixels (particularly pixels formed in the vicinity of the center of the display screen) occupying at least equal to or more than 10% of the total number of pixels which constitute the display screen satisfy such a condition.

Structural Feature 5:

The liquid crystal display device comprises the first substrate having the main surface on which a plurality of signal lines which extend in the first direction and are arranged in parallel in the second direction which intersects the first direction and a plurality of pixels which are arranged in a row along the first direction between every pair of neighboring signal lines out of the plurality of signal lines are formed, and the second substrate SUB2 having the main surface on which the black matrix BM having a plurality of openings which respectively face the plurality of pixels in an opposed manner respectively is formed, wherein each pixel includes the pixel electrode PIX which receives video signals from one Xn of the pair of signal lines which sandwich the pixel, the first light shielding film SHL which is overlapped to the periphery of the pixel electrode along one Xn of the pair of signal lines and extends along the extending direction of the signal lines and the second light shielding film SHR which is overlapped to the periphery of the pixel electrode along the other Xn+1 of the pair of signal lines and extends along the extending direction of the signal line.

In the liquid crystal display device having such a constitution, the center BCEN of the distance BW defined between a pair of spaced-apart openings out of the plurality of openings of the black matrix BM which respectively correspond to the neighboring pair of pixels along the second direction out of the plurality of pixels is offset to one side of the pair of pixels (offset to the first light shielding film SHL side which is formed on the other of the pair of the pixels) from the center SCEN of the distance SHW between an end portion of the first light shielding film SHL formed on one of the pair of neighboring pixels (the pixel electrode PIX formed in the pixel being overlapped to the end portion) and an end portion of the second light shielding film SHR which is formed on the other of the pair of pixels and is disposed adjacent to the first light shielding film SHL of one of the pair of pixels (another pixel electrode PIX which is different from the above-mentioned pixel electrode formed on the pixel being overlapped to the end portion).

This feature appears when both of the pixel shown at the center of FIG. 14 and FIG. 15 and the separate pixel formed at the left side of such a pixel have the structure according to the present invention.

Structural Feature 6:

The liquid crystal display device comprises the first substrate SUB1 having the main surface on which a plurality of signal lines and pixel electrodes PIX each of which is formed between a pair of neighboring signal lines Xn, Xn+1 out of the plurality of signal lines and receives the video signals from one Xn of the pair of signal lines are formed, and the second substrate SUB2 having the main surface on which the black matrix BM having openings which face the above-mentioned pixel electrodes in an opposed manner is formed.

In the liquid crystal display device having such a constitution, the openings of the black matrix BM are formed such that the black matrix BM is overlapped to the first periphery of the above-mentioned pixel electrode PIX along one Xn of the above-mentioned pair of signal lines and the second periphery of the above-mentioned pixel electrode PIX along the other Xn+1 of the pair of signal lines. Further, the overlapping width Wb of the black matrix BM and the second periphery of the pixel electrode PIX when the above-mentioned black matrix BM is projected to the second periphery of the above-mentioned pixel electrode PIX (along the thickness direction of either one of the above-mentioned substrates) is set wider than the overlapping width Wa of the black matrix BM and the first periphery of the pixel electrode PIX when the above-mentioned black matrix BM is projected to the first periphery of the above-mentioned pixel electrode PIX. The above-mentioned overlapping widths are, for example, defined as a size along the direction perpendicular to the extending direction of the signal lines.

The pixel structure which satisfies at least one of the above-mentioned structural features 1 to 6 is not always formed over the whole area of the liquid crystal display panel and the pixel structure may be formed on the center portion of the display area. That is, as mentioned previously, the periphery of the liquid crystal display panel receives the influence of error in the exposure step or the like and hence, it is difficult for the periphery of the liquid crystal display panel to satisfy any one of the above-mentioned structural features 1 to 6. However, by producing the above-mentioned first substrate SUB1 and the above-mentioned second substrate SUB2 respectively such that such structural features are satisfied at the center or other specific area of the display area and by combining them, it is ensured that the leaking of light which is to be solved by the present invention can be reduced in areas other then such areas.

Figure 21:
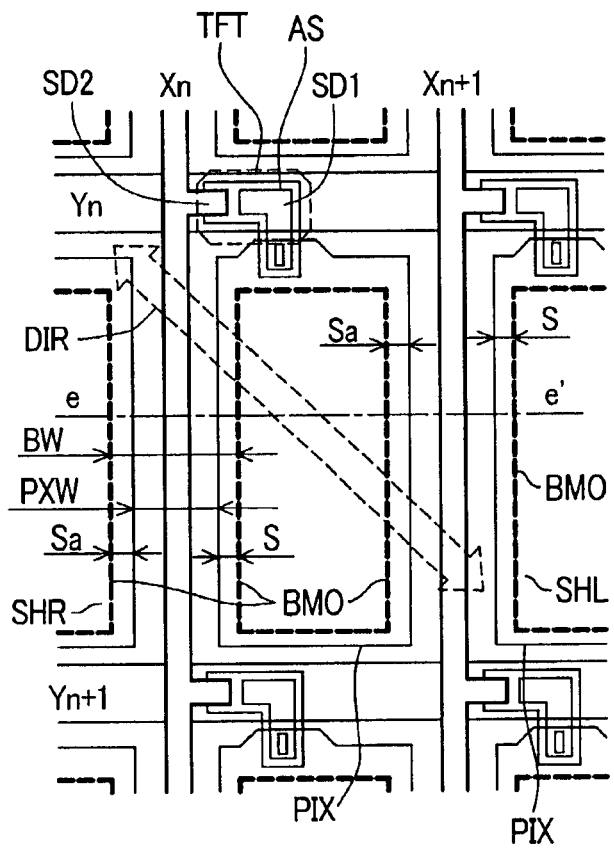
FIG. 21 is a schematic view of the pixel structure in an enlarged form for explaining the constitution of a modification based on the second embodiment of the liquid crystal display device of the present invention.
Figure 22:
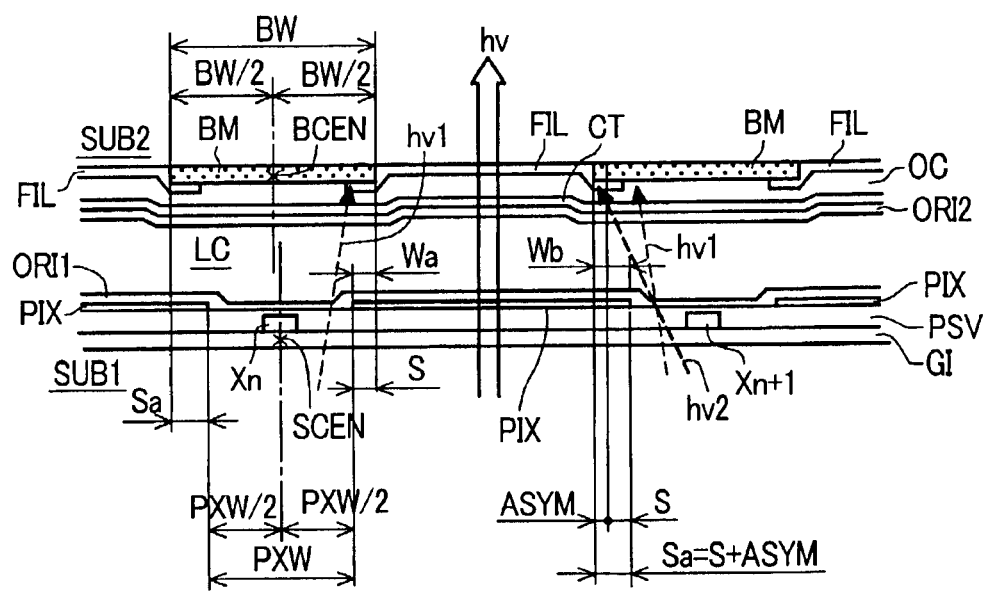
FIG. 22 is a cross-sectional view taken along a line e–e' of FIG. 21.

The above-mentioned structural features 3 and 6 are defined without requiring the light shielding films SHL, SHR formed on the first substrate SUB1. Accordingly, as a modification which applies the second embodiment of the liquid crystal display device according to the present invention to the first case, a pixel structure shown in FIG. 21 and FIG. 22 is obtained. Although the constituent features shown in FIG. 21 and FIG. 22 are substantially equal to those shown in FIG. 12 and FIG. 13, the surfaces of the pixel electrodes PIX and the orientation film ORI1 are leveled more by an amount corresponding to the elimination of the light shielding films SHL, SHR. Here, in FIG. 22, S and Sa are respectively equal to Wa and Wb.

The structural feature of this embodiment can be, following the above-mentioned structural feature 2, expressed as the shifting of position between the center BCEN of the spaced-apart distance BW formed between the openings of the black matrix which respectively face a pair of neighboring pixels in the direction perpendicular to the signal line Xn and the center PCEN of the spaced-apart distance PXW formed between the pixel electrodes PIX which are respectively formed on the pair of pixels (close to each other over the signal line Xn).

In the pixel structure shown in FIG. 21 and FIG. 22, the center BCEN between the openings BMO of the black matrix BM is shifted to the left side from the center PCEN between the pixel electrodes PIX (that is, at the pixel side which does not receive the video signals from the signal line Xn which is arranged between the pixel electrodes PIX). When this pixel structure is applied to the above-mentioned second case, it is estimated from the above-mentioned structural feature 5 that the center BCEN between the openings BMO of the black matrix BM is shifted to the right side from the center PCEN between the pixel electrodes PIX (that is, at the pixel side which receives the video signals from the signal line Xn which is arranged between the pixel electrodes PIX).

The embodiments described heretofore relate to the pixel structures which reduce the leaking of light which is generated asymmetrically at the left and right sides on the pixel electrodes PIX using the light shielding layers (black matrix and light shielding films) which are respectively formed on the second substrate SUB2 or on the first substrate SUB1 and the second substrate SUB2. However, the pixel structure which forms the light shielding layers only on the first substrate SUB1 can also reduce the leaking of light. A pixel structure which is explained hereinafter in conjunction with FIG. 16 and FIG. 17 is such an example. Even when the first substrate SUB1 illustrated in these drawings may be combined with the second substrate SUB2 which is illustrated in the above-mentioned embodiments on which the black matrix BM is formed, such a combination does not impede the practice of the present invention.

Figure 16A:
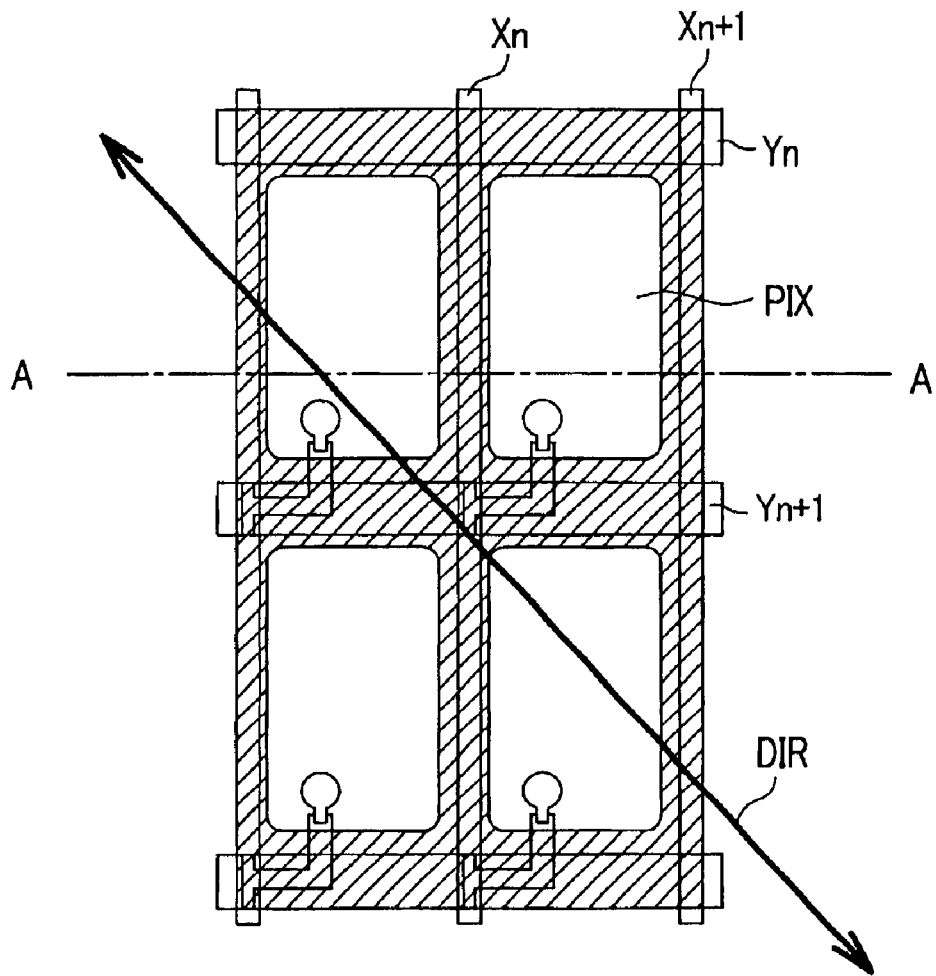
FIG. 16A and FIG. 16B are explanatory views of the third embodiment of the liquid crystal display device of the present invention.
Figure 16B:
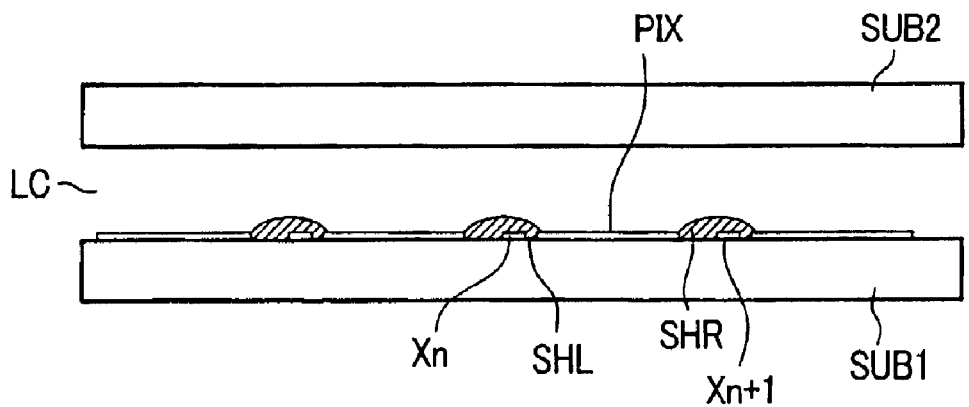
Figure 17A:
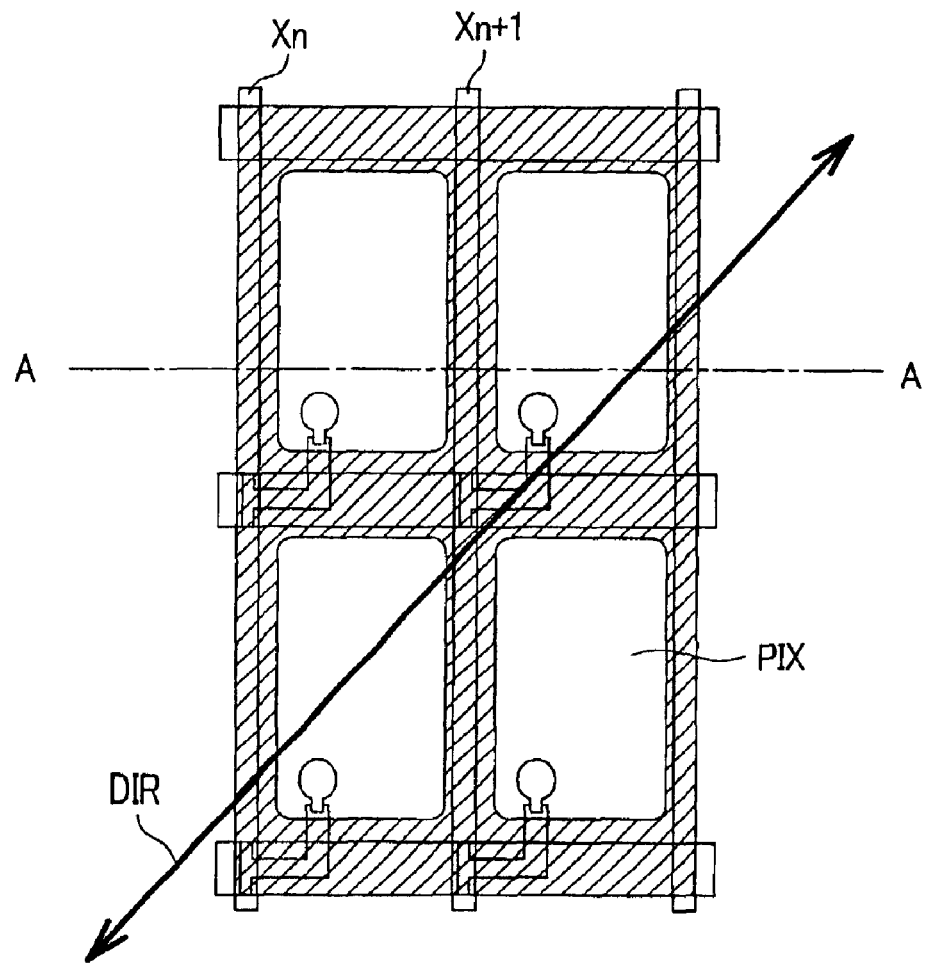
FIG. 17A and FIG. 17B are another explanatory views of the third embodiment of the liquid crystal display device of the present invention.
Figure 17B:
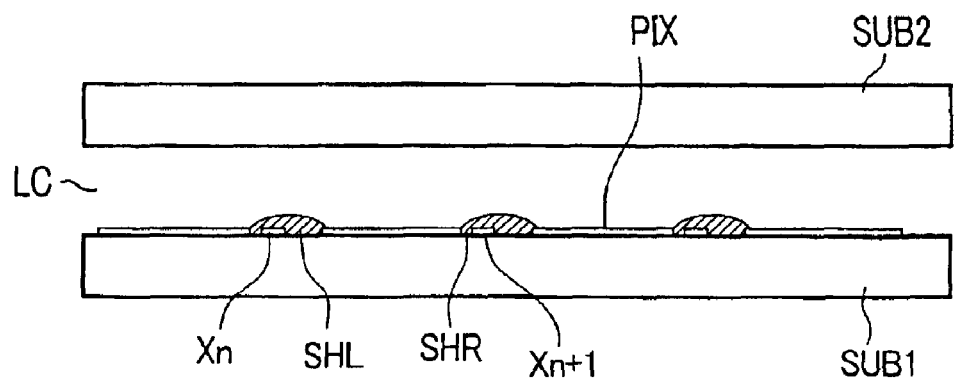

FIG. 16A, FIG. 16B and FIG. 17A, FIG. 17B are explanatory views for explaining the third embodiment of the liquid crystal display device according to the present invention. That is, the drawings show the embodiment in which the present invention is applied to the liquid crystal display device of a type which forms a light shielding film such that the film covers video signal lines X (Xn, Xn+1, . . . ) and pixel electrodes formed on a first substrate. FIG. 16A shows a case in which an intersecting angle in the clockwise direction which the rubbing direction of an orientation film makes with respect to the video signal line Xn is an obtuse angle, while FIG. 17A shows a case in which the intersecting angle in the clockwise direction which the rubbing direction of the orientation film makes with respect to the video signal line Xn is an acute angle. FIG. 16A and FIG. 17A are schematic views showing the pixel portion in an enlarged form, while FIG. 16B and FIG. 17B are respectively schematic cross-sectional views taken along a line A—A in FIG. 16A and FIG. 17A.

In the case shown in FIG. 16A and FIG. 16B where the intersecting angle in the clockwise direction which the rubbing direction of the orientation film of the first substrate SUB1 makes with respect to the video signal line Xn is an obtuse angle, a width of the light shielding film SHR which covers the video signal line Xn+1 for driving the pixel electrode PIX disposed adjacent to and at the right side of the target pixel electrode PIX is set greater than a width of the light shielding film SHL which covers the video signal line Xn for driving the target pixel electrode PIX. Here, a black matrix may be formed or may be not formed on a main surface of the second substrate SUB2.

In the case shown in FIG. 17A and FIG. 17B where the intersecting angle in the clockwise direction which the rubbing direction of the orientation film of the first substrate SUB1 makes with respect to the video signal line Xn is an acute angle, a width of the light shielding film SHL which covers the video signal line Xn for driving the target pixel electrode PIX is set greater than a width of the light shielding film SHR which covers the video signal line Xn+1 for driving the pixel electrode PIX disposed adjacent to and at the right side of the target pixel electrode PIX. Here, a black matrix may be formed or may be not formed on a main surface of the second substrate SUB2.

Also according to this embodiment, the reduction of the contrast at the left-and-right oblique viewing angle can be suppressed and hence, the bright display can be obtained without lowering the numerical aperture. Here, in this embodiment, for facilitating the explanation, among the structural features illustrated in FIG. 13 and FIG. 15, some structural features (orientation films ORI1, ORI2 and counter electrode CT) which are not directly relevant to the practice of the present invention are omitted from both of FIG. 16B and FIG. 17B. In both of FIG. 16B and FIG. 17B, on an uppermost surface of at least the first substrate SUB1 or also of the second substrate SUB2 when necessary, the orientation films ORI1, ORI2 illustrated in FIG. 13 and FIG. 15 or equivalents thereof are formed.

Following the embodiments shown in FIG. 13 and FIG. 15, other omitted structural features are also suitably applicable to any constitutions of this embodiment. Here, in this embodiment, the pixel electrodes PIX are separated by the light shielding films SHL, SHR made of insulation material such as resin. Accordingly, it is possible to electrochemically precipitate the color filter materials on respective pixel electrodes PIX by immersing the first substrate SUB1 into an electrolytic solution in which color filter materials are dispersed.

Figure 18:
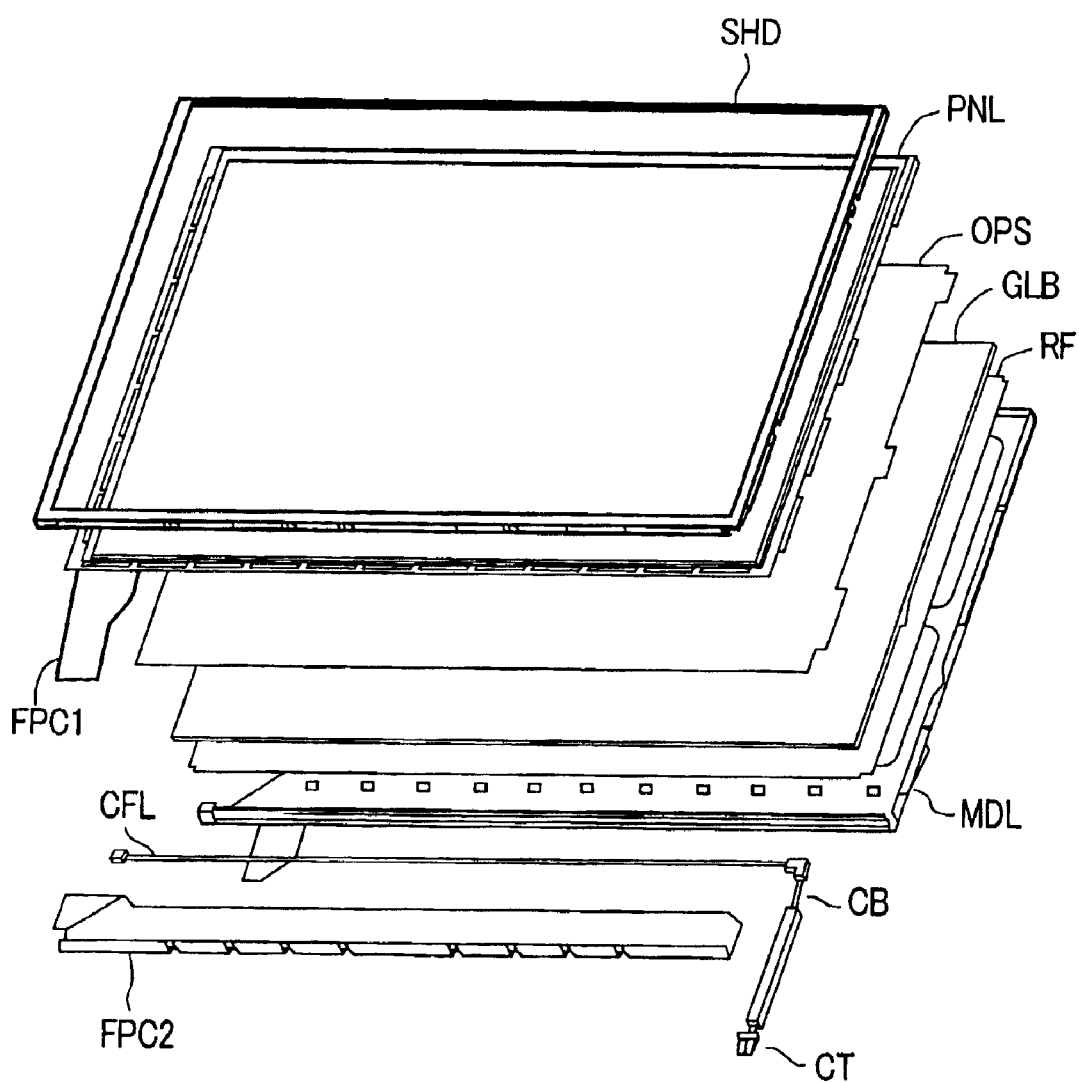
FIG. 18 is a developed perspective view for explaining the whole constitutional view of the liquid crystal display module using the liquid crystal display device of the present invention.
Figure 19A:
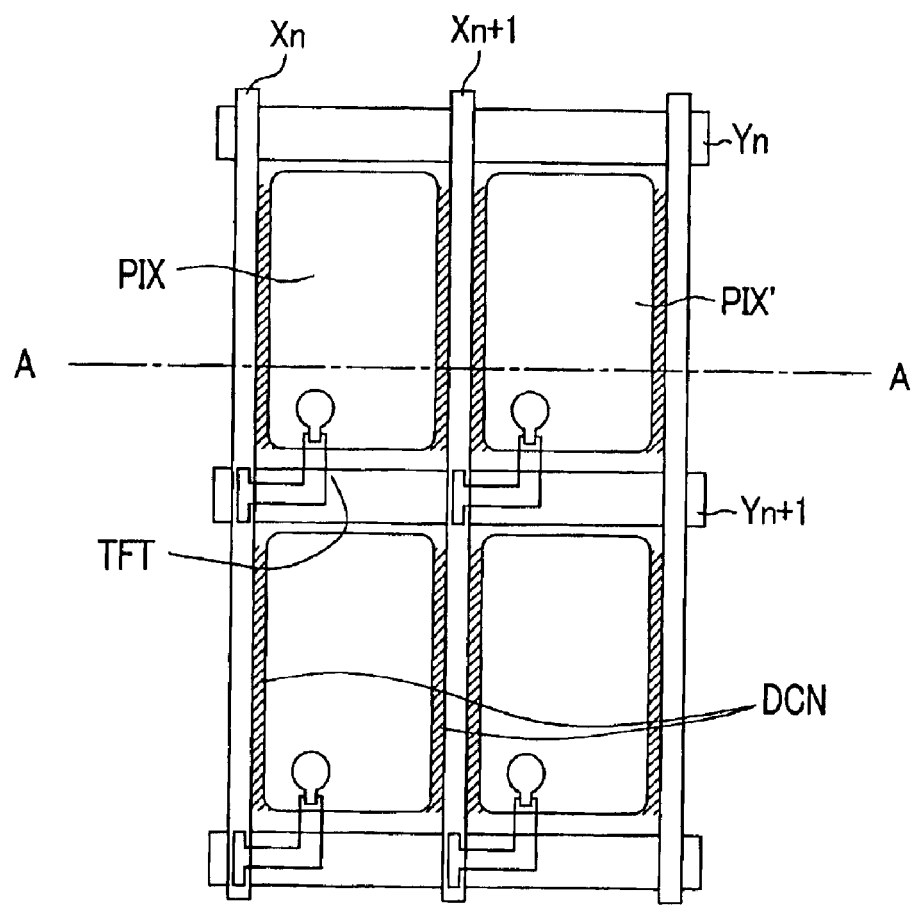
FIG. 19A and FIG. 19B are schematic views showing a pixel portion of a TN type liquid crystal display device in an enlarged form.
Figure 19B:
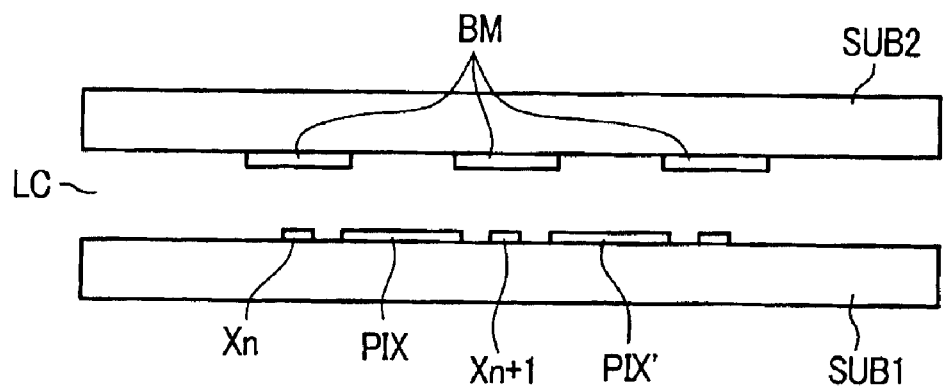
Figure 20A:
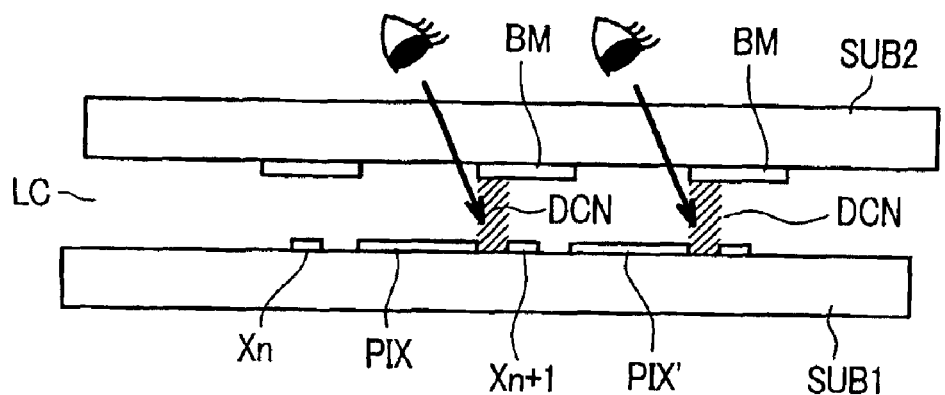
FIG. 20A and FIG. 20B are schematic views for explaining the leaking of light which is generated asymmetrically in the periphery of the pixel electrode and is found by inventors of the present invention.
Figure 20B:
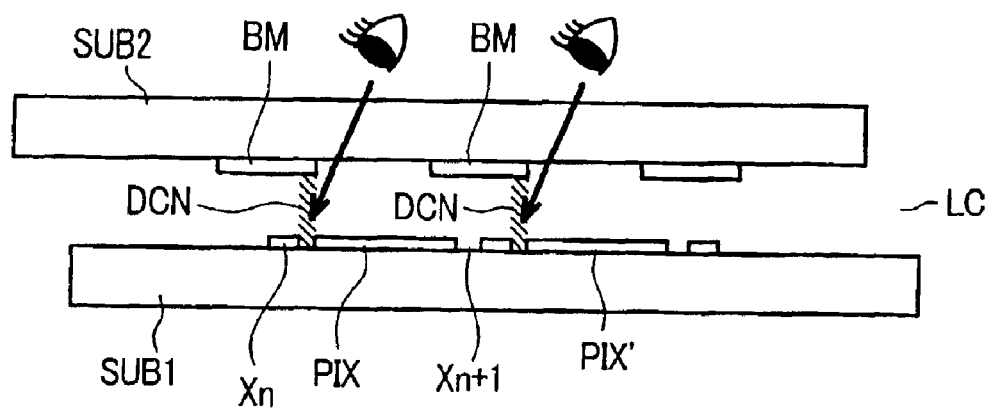

FIG. 18 is a developed perspective view for explaining an example of the whole constitution of a liquid crystal display module in which the liquid crystal display device according to the present invention is used. The liquid crystal display module includes a backlight which is constituted by mounting a light guide plate GLB and a cold cathode fluorescent lamp CFL as a linear light source on a back surface of a liquid crystal display device PNL. A flexible printed circuit board FPC1 on which a scanning driving circuit (integrated circuits or the like) is mounted is connected to a short side of the liquid crystal display device PNL, while a flexible printed circuit board FPC2 on which a video signal driving circuit (integrated circuits or the like) is mounted is connected to a long side of the liquid crystal display device PNL.

A reflection plate RF is provided to a back surface of the light guide plate GLB which constitutes the backlight. Optical compensation sheets OPS consisting of a diffusion sheet and a prism sheet are interposed between the light guide plate GLB and the liquid crystal display device PNL. These components are sandwiched by a lower casing MDL and an upper casing SHD and are integrally formed together with these casings. Various types of driving signal and power supplies are fed from a host computer side to the liquid crystal display module through an interface board not shown in the drawing. In FIG. 18, reference symbol CB indicates a power supply cable and reference symbol CT indicates a connector. Electricity is supplied to the cold cathode fluorescent lamp CFL from the host computer side through the power supply cable.

As has been explained heretofore, according to the present invention, by setting the width of the black matrix or the light shielding film at the shifting direction side and the width of the black matrix or the light shielding film at the side opposite to the shifting direction side asymmetrical in response to the video signal lines provided to the first substrate and the rubbing direction of the orientation film, it is possible to increase the tolerance of overlapping of the first substrate and the second substrate while suppressing the reduction of the numerical aperture so that the contrast of the vision in the left and right direction on the screen can be enhanced whereby the liquid crystal display device of high quality can be realized.

What is claimed is:

1. A liquid crystal display device comprising:
   a first substrate having a main surface on which a plurality of pixel electrodes are arranged along a first direction and a second direction transverse to the first direction, and a plurality of signal lines are extended along the first direction and juxtaposed along the second direction;
   a second substrate having a main surface on which a black matrix is formed and being bonded to the first substrate to space the main surface of the second substrate from the main surface of the first substrate being opposite to each other; and
   a liquid crystal layer sealed between the first substrate and the second substrate, wherein
   an alignment film contacting with the liquid crystal layer is formed on a main surface of the first substrate,
   a group of the plurality of pixel electrodes forming a line along the first direction in an area between a pair of the plurality of signal lines adjacent to one another, and each of the pixel electrodes forming the line is connected to one of the pair of the signal lines through a switching element,
   the black matrix overlaps an edge portion of each pixel electrode of the group of pixel electrodes forming the line which extends along said one of the pair of the signal lines and forms a first light shielding portion having a first width along the second direction,
   the black matrix overlaps another edge portion of said each pixel electrode of the group of pixel electrodes forming the line which extends along another of the pair of the signal lines and forms a second light shielding portion having a second width along the second direction,
   rubbing treatment is applied to the alignment film in the main surface of the first substrate from said one of the pair of the signal lines which is adjacent to the first light shielding portion having the first width to said another of the pair of the signal lines which is adjacent to the second light shielding portion having the second width in a direction meeting an extension direction of at least one of the pair of the signal lines at an obtuse angle clockwise from the extension direction, and
   the second width of the second light shielding portion is broader than the first width of the first light shielding portion.

2. A liquid crystal display device according to claim 1, wherein the plurality of pixel electrodes are divided into a plurality of the groups of pixel electrodes juxtaposed along the second direction and each group forming one line along the first direction, the black matrix extends from the second light shielding portion formed in one of the plurality of pixel electrodes belonging to one of the groups to the first light shielding portion formed in another one of the groups adjacent to said one of the groups across one of the signal lines in the second direction and covers said one of signal lines.

3. A liquid crystal display device according to claim 2, wherein the plurality of signal lines are image signal lines each supplying image signals to corresponding one of the plurality of the groups of the pixel electrodes.

4. A liquid crystal display device according to claim 1, wherein the another of the pair of the signal lines is not connected to said each of the pixel electrodes of the group of the pixel electrodes forming the line between the pair of the signal lines.

5. A liquid crystal display device comprising:
   a first substrate having a main surface on which a plurality of pixel electrodes are arranged along a first direction and a second direction transverse to the first direction, and a plurality of signal lines are extended along the first direction and juxtaposed along the second direction;
   a second substrate having a main surface on which a black matrix is formed and being bonded to the first substrate to space the main surface of the second substrate from the main surface of the first substrate each being opposite to each other; and a liquid crystal layer sealed between the first substrate and the second substrate, wherein an alignment film contacting with the liquid crystal layer is formed on a main surface of the first substrate, a group of the plurality of pixel electrodes forming a line along the first direction in an area between a pair of the plurality of signal lines adjacent to one another, and each of the pixel electrodes forming the line is connected to one of the pair of the signal lines through a switching element, the black matrix overlaps an edge portion of each pixel electrode of the group of pixel electrodes forming the line which extends along said one of the pair of the signal lines and forms a first light shielding portion having a first width along the second direction, the black matrix overlaps another edge portion of said each pixel electrode of the group of pixel electrodes forming the line which extends along another of the pair of the signal lines and forms a second light shielding portion having a second width along the second direction, rubbing treatment is applied to the alignment film in the main surface of the first substrate from said another of the pair of the signal lines which is adjacent to the second light shielding portion having the second width to said one of the pair of the signal lines which is adjacent to the first light shielding portion having the first width in a direction meeting an extension direction of at least one of the pair of the signal lines at an acute angle clockwise from the extension direction, and the first width of the first light shielding portion is broader than the second width of the second light shielding portion.

6. A liquid crystal display device according to claim 5, wherein the plurality of pixel electrodes are divided into a plurality of the groups of pixel electrodes juxtaposed along the second direction and each group forming one line along the first direction, the black matrix extends from the second light shielding portion formed in one of the plurality of pixel electrodes belonging to one of the groups to the first light shielding portion formed in another one of the groups adjacent to said one of the groups across one of the signal lines in the second direction and covers said one of signal lines.

7. A liquid crystal display device according to claim 6, wherein the plurality of signal lines are image signal lines each supplying image signals to corresponding one of the plurality of the groups of the pixel electrodes.

8. A liquid crystal display device according to claim 5, wherein the another of the pair of the signal lines is not connected to said each of the pixel electrodes of the group of the pixel electrodes forming the line between the pair of the signal lines.

* * * * *